(12) United States Patent
Thornton et al.

(10) Patent No.: US 11,657,313 B2
(45) Date of Patent: *May 23, 2023

(54) SYSTEMS AND METHODS FOR PRESERVATION OF QUBITS

(71) Applicant: Anametric, Inc., Austin, TX (US)

(72) Inventors: Mitchell A. Thornton, Dallas, TX (US); Duncan L. MacFarlane, Dallas, TX (US); Timothy P. LaFave, Jr., Dallas, TX (US); William V. Oxford, Austin, TX (US)

(73) Assignee: ANAMETRIC, INC., Austin, TX (US)

( * ) Notice: Subject to any disclaimer, the term of this patent is extended or adjusted under 35 U.S.C. 154(b) by 174 days.

This patent is subject to a terminal disclaimer.

(21) Appl. No.: 17/103,394

(22) Filed: Nov. 24, 2020

(65) Prior Publication Data
US 2021/0103850 A1   Apr. 8, 2021

Related U.S. Application Data

(63) Continuation of application No. 16/748,481, filed on Jan. 21, 2020, now Pat. No. 10,878,333, which is a continuation of application No. 15/965,286, filed on Apr. 27, 2018, now Pat. No. 10,579,936.

(60) Provisional application No. 62/491,815, filed on Apr. 28, 2017.

(51) Int. Cl.
*G06N 10/00* (2022.01)

(52) U.S. Cl.
CPC .................................. *G06N 10/00* (2019.01)

(58) Field of Classification Search
CPC ............................... G06N 10/10; G06N 10/00
USPC .......................................................... 708/200
See application file for complete search history.

(56) References Cited

U.S. PATENT DOCUMENTS

| | | |
|---|---|---|
| 6,678,450 B1 | 1/2004 | Franson |
| 7,113,967 B2 | 9/2006 | Cleve et al. |
| 7,359,101 B2 | 4/2008 | Beausoleil et al. |
| 7,893,708 B2 | 2/2011 | Baumgardner et al. |
| 7,966,549 B2 | 6/2011 | Hollenberg et al. |
| 8,101,083 B2 | 2/2012 | Pesetski et al. |
| 8,111,083 B1 | 2/2012 | Pesteski |
| 8,386,899 B2 | 2/2013 | Goto et al. |
| 10,579,936 B2 | 3/2020 | Thornton et al. |
| 10,878,333 B2 | 12/2020 | Thornton |
| 2018/0157986 A1 | 6/2018 | Oxford et al. |
| 2018/0314969 A1 | 11/2018 | Thornton et al. |
| 2019/0049495 A1 | 2/2019 | Ofek et al. |

(Continued)

OTHER PUBLICATIONS

Einstein et al., "Can Quantum-Mechanical Description of Physical Reality be Considered Complete?," Physical Review, vol. 47, Institute for Advanced Study, May 15, 1935, pp. 777-780.

(Continued)

*Primary Examiner* — Tan V Mai
(74) *Attorney, Agent, or Firm* — Sprinkle IP Law Group

(57) ABSTRACT

Embodiments of quantum ring oscillator-based coherence preservation circuits including a cascaded set of stages are described. Embodiments of such quantum ring oscillator-based coherence preservation circuits allow the internal (superpositioned) quantum state information of stored qubits to be preserved over long periods of time and present options for the measurement and potential correction of both deterministic and non-deterministic errors without disturbing the quantum information stored in the structure itself.

20 Claims, 4 Drawing Sheets

(56) References Cited

U.S. PATENT DOCUMENTS

2019/0080255 A1    3/2019   Allen et al.
2020/0160206 A1    5/2020   Thornton et al.

OTHER PUBLICATIONS

Bell, "On the Einstein Podolsky Rosen Paradox," Physics, vol. 1, No. 3, Physics Publishing Co., Nov. 4, 1964, pp. 195-200.
Bell, "On the Problem of Hidden Variables in Quantum Mechanics," Reviews of Modern Physics, vol. 38, No. 3, Jul. 1966, The American Physical Society, pp. 447-452.
Freedman et al., "Experimental Test of Local Hidden-Variable Theories," Physical Review Letters, vol. 28, No. 14, Apr. 3, 1972, pp. 938-941.
Aspect et al., "Experimental Tests of Realistic Local Theories via Bell's Theorem," Physical Review Letters, vol. 47, No. 7, The American Physical Society, Aug. 17, 1981, pp. 460-463.
Aspect et al., "Experimental Test of Bell's Inequalities Using Time-Varying Analyzers," Physical Review Letters, vol. 49, No. 25, The American Physical Society, Dec. 20, 1982, pp. 1804-1807.
Fazel et al., "ESOP-based Toffoli Gate Cascade Generation," IEEE Pacific Rim Conference on Communications, Computers, and Signal Processing, Aug. 22-24, 2007, pp. 206-209.
Niemann et al., "QMDDs: Efficient Quantum Function Representation and Manipulation," IEEE Transactions on Computer-Aided Design of Integrated Circuits and Systems, vol. 35, No. 1, January 2016, pp. 86-99.
Patel et al., "A Quantum Fredkin Gate," Science Advances, vol. 2, No. 3, American Association for the Advancement of Science, Mar. 25, 2016, 8 pages.
Deutsch, "Quantum Theory, the Church-Turing Principle and the Universal Quantum Computer," Proceedings of the Royal Society of London A, 400, 1985, 19 pages.
Divincenzo, "Quantum Gates and Circuits," Philosophical Transactions of the Royal Society of London A, 1996, 18 pages.
Barenco et al., "Elementary Gates for Quantum Computation," Physical Review A, Mar. 22, 1995, 31 pages.
O'Brien et al., "Demonstration of an All-Optical Quantum Controlled-NOT Gate," Nature, vol. 426, Nov. 20, 2003, 5 pages.
O'Brien, "Optical Quantum Computing," Science, vol. 318, 2007, 5 pages.
Cerf et al., "Optical Simulation of Quantum Logic," Mar. 1997, retrieved from arXiv:quant-ph/9706022v1, 4 pages.
Garcia-Escartin et al., "Equivalent Quantum Circuits," Oct. 14, 2011, retrieved from arXiv:quant-ph/1110.2998v1, 12 pages.
Diffie et al., "New Directions in Cryptography," IEEE Transactions on Information Theory, vol. IT-22, No. 6, Nov. 1976, pp. 644-654.
El Nagdi et al., "Active Integrated Filters for RF-Photonic Channelizers," Sensors 2011, vol. 11, Issue 2, ISSN 1424-8220, Jan. 25, 2011, pp. 1297-1320.
Sultana et al., "HBr Based Inductively Coupled Plasma Etching of High Aspect Ratio Nanoscale Trenches in InP: Considerations for Photonic Applications", J. Vac. Sci. Technol. B, vol. 27, No. 6, American Vacuum Society, Nov./Dec. 2009, pp. 2351-2356.
Jiang et al., "Arrayed Waveguide Gratings Based on Perfluorocyclobutane Polymers for CWDM Applications," IEEE Photonics Technology Letters, vol. 18, No. 2, Jan. 15, 2006, pp. 370-372.
Smith, Jr., et al., "Perfluorocyclobutyl Copolymers for Microphotonics", Advanced Materials, vol. 14, No. 21, Wiley-VCH, Nov. 4, 2002, pp. 1585-1589.
Steier et al., "Polymer Electro-Optic Devices for Integrated Optics", Chemical Physics, vol. 245, Elsevier Science B.V., 1999, pp. 487-506.
Ono et al., "Implementation of a Quantum Controlled-SWAP Gate with Photonic Circuits", Apr. 6, 2017, retrieved from arXiv:1704.01348v1, 9 pages.
Miller et al., "QMDD: a Decision Diagram Structure for Reversible and Quantum Circuits", Proceedings of the Int'l Symposium on Multiple-Valued Logic, Jun. 2006, IEEE, 6 pages.
Huntoon et al., "Integrated Photonic Coupler Based on Frustrated Total Internal Reflection", Applied Optics, vol. 47, No. 30, Optical Society of America, Oct. 20, 2008, pp. 5682-5690.
Deutsch, D., "Quantum Computational Networks," Proc. of Royal Society of London A, 425 (1868), 1989, pp. 73-90.
Ameduri, A., Boutevin, B. and Kostov, B., "Fluoroelastomers: synthesis, properties and applications," Progress in Polymer Science, vol. 26, Feb. 2001, pp. 105-187.
Ballato, J., Foulger, S., and Smith Jr., D.W., "Optical properties of perfluorocyclobutyl polymers", Journal of Optical Society of America, vol. 20, Issue 9, 2003, pp. 1838-1843.
Iacono, S.T., Budy, S.M., Ewald, D., and Smith Jr., D.W., "Facile preparation of fluorovinylene aryl ether telechelic polymers with dual functionality for thermal chain extension and tandem crosslinking", Chemical Communications, vol. 46, Jan. 2007, pp. 4844.
Jiang, J., Callender, C.L., Blanetiere, C. et al., "Property-tailorable PFCB-containing polymers for wavelength division devices", Journal of Lightwave Technology, vol. 24(8), 2006, pp. 3227-3234.
Suresh, S., Gulotty Jr., R., Bales, S.E. et al., "A novel polycarbonate for high temperature electro-optics via azo bisphenol amines accessed by Ullmann coupling", Polymer, vol. 44, No. 18, Aug. 1, 2003, 5111.
Suresh, S., Zengin, H., Spraul, B.K. et al., "Synthesis and hyperpolarizabilities of high temperature triarylamine-polyene chromophores", Tetrahedron Letters, vol. 46, Issue 22, May 30, 2005, pp. 3913-3916.
International Search Report and Written Opinion issued for International Application No. PCT/US2017/064731, dated Mar. 7, 2018, 7 pages.
International Search Report and Written Opinion issued for International Application No. PCT/US2018/029888, dated Jan. 2, 2019, 10 pages.
Zhang et al., "Quantum Feedback: Therory, Experiments, and Applications," Physics Reports, Oct. 31, 2014, 80 pages.
International Preliminary Report on Patentability issued for International Application No. PCT/US2017/064731, dated Jun. 20, 2019, 6 pages.
DiVincenzo, "The Physical Implementation of Quantum Computation", Fortsohritte der Physik 48, p. 771 (2000).
Monz, T. et al. "Realization of the quantum Toffoli gate with trapped ions". Phys. Rev. Lett. 102, 040501 (2009).
W. Zhou, N. Sultana and D. L. MacFarlane "HBr-Based Inductively Coupled Plasma Etching of High Aspect Ratio Nanoscale Trenches in GaInAsP/InP" J. Vac. Sci. Technol. B 26 1896 (2008).
International Preliminary Report on Patentability issued for International Application No. PCT/US2018/029888, dated Nov. 7, 2019, 9 pages.
Office Action issued for U.S. Appl. No. 16/748,481 dated Feb. 20, 2020, 12 pages.
Office Action issued for U.S. Appl. No. 16/748,481 dated May 22, 2020, 4 pgs.
Notice of Allowance issued for U.S. Appl. No. 16/748,481 dated Aug. 25, 2020, 2 pgs.
Office Action for U.S. Appl. No. 15/832,285, dated Nov. 12, 2020, 7 pgs.

US 11,657,313 B2

SYSTEMS AND METHODS FOR PRESERVATION OF QUBITS

CROSS-REFERENCE TO RELATED APPLICATIONS

This application is a continuation of, and claims a benefit of priority under 35 U.S.C. 120 of the filing date of U.S. patent application Ser. No. 16/748,481, filed Jan. 21, 2020, entitled "SYSTEMS AND METHODS FOR PRESERVATION OF QUBITS", issued as U.S. Pat. No. 10,878,333, which is a continuation of, and claims a benefit of priority under 35 U.S.C. 120 of the filing date of U.S. patent application Ser. No. 15/965,286, filed Apr. 27, 2018, entitled "SYSTEMS AND METHODS FOR PRESERVATION OF QUBITS", issued as U.S. Pat. No. 10,579,936, which claims a benefit of priority under 35 U.S.C. § 119 to U.S. Provisional Patent Application No. 62/491,815 filed Apr. 28, 2017, entitled "QUANTUM STATE OSCILLATORS AND METHODS FOR OPERATION AND CONSTRUCTION OF SAME", the entire contents of which are hereby expressly incorporated by reference for all purposes.

TECHNICAL FIELD

This disclosure relates generally to quantum computing. In particular, this disclosure relates to embodiments of systems and methods for preserving quantum coherence of a qubit.

BACKGROUND

Certain computational problems, such as the factoring of large numbers, cannot easily be solved using conventional computers due to the time required to complete the computation. It has, however, been shown that quantum computers can use non-classical algorithmic methods to provide efficient solutions to certain of these types of computational problems.

The fundamental unit of quantum information in a quantum computer is called a quantum bit, or qubit. Quantum computers can use a binary representation of numbers, just as conventional binary computers. In addition, quantum systems can also make us of use multi-valued logic and data, in which case, the atomic quantum datum is referred to as a "qudit". An individual qubit or qudit datum can be physically represented by the state of a quantum system. However, in a quantum system, the datum can be considered to be in more than one of the possible states at any single given time. Thus, in the case of a qubit, the datum can be in a state that represents both a zero and a one at the same time. This state is referred to as superposition. Quantum superpositions of this kind are fundamentally different from classical data representations, even when classical probabilities are taken into account. It is only when a quantum datum is observed that its value "collapses" into a well-defined, single state. This "collapse" is referred to as decoherence.

Thus, while bits in the classical computing model always have a well-defined value (e.g., 0 or 1), qubits in superposition have some simultaneous probability of being in both of the two states representing 0 and 1. It is customary to represent the general state of a quantum system by $|\psi\rangle$, and let $|0\rangle$ and $|1\rangle$ represent the quantum states corresponding to the values 0 and 1, respectively. Quantum mechanics allows superpositions of these two states, given by $$|\psi\rangle = \alpha|0\rangle + \beta$$

where $\alpha$ and $\beta$ are complex numbers. In this case, the probability of observing the system in the state $|0\rangle$ is equal to $\alpha 2$ the probability of the state $|1\rangle$ is $\beta^2$.

Quantum computers may utilize physical particles to represent or implement these qubits or qudits. One example is the spin of an electron, wherein the up or down spin can correspond to a 0, a 1, or a superposition of states in which it is both up and down at the same time. Performing a calculation using the electron may essentially perform the operation simultaneously for both a 0 and a 1. Similarly, in the photonic approach to quantum computing, a "0" may be represented by the possibility of observing a single photon in a given path, whereas the potential for observing the same photon in a different path may represent a "1".

For example, consider a single photon passing through an interferometer with two paths, with phase shifts $\varphi_1$ and $\varphi_2$ inserted in the two paths respectively. A beam splitter gives a 50% probability that the photon will travel in one path or the other. If a measurement is made to determine where the photon is located, it will be found in only one of the two paths. But if no such measurement is made, a single photon can somehow experience both phase shifts $\varphi_1$ and $\varphi_2$ simultaneously. This suggests that in some sense a photon must be located in both paths simultaneously if no measurement is made to determine its position. This effect can be experimentally verified by observing the interference pattern resulting from the interaction of the two paths when only a single photon is allowed to transit through the apparatus at a given time. Of course, if there are more than a single pair of possible photonic paths, then the resulting system can be said to represent a qudit.

One of the most challenging problems with practical quantum computing, however, is the realization of the physical system that represents the qubits themselves. More specifically, the scale at which qubits are typically implemented (e.g., a single electron, a single photon, etc.) means that any perturbations in the qubit caused by unwanted interactions with the environment (e.g., temperature, magnetic field, etc.) may result in an alteration to the state of the qubit or even decoherence. Quantum coherence preservation (e.g., maintenance or storage of the qubit in a quantum state for any useful time period) within a single qubit (or multiple qubits) is thus a major obstacle to the useful implementation of quantum computing. Exacerbating the problem is the fact that when several such qubits are placed in close proximity to one another they can potentially mutually interfere (e.g., electromagnetically) with each other and, thereby, affect adjacent qubits. In some cases, that interference is desired (in the case of quantum data computation operations, for example), but in the case where that interference is uncontrolled, then it can lead to incorrect computational results. Such unwanted interference effects are sometimes referred to as quantum gate or processing infidelities.

Accordingly, there is a need to for systems and methods that can both preserve coherence of a qubit from external interference as well as to allow the operations on that qubit to be corrected in the presence of unwanted quantum operational infidelities.

SUMMARY

To address this need, among others, attention is directed to embodiments of systems and methods for preserving quantum coherence as depicted herein. A bit of additional context may be useful to an understanding of such embodiments. The generation and subsequent use of superimposed quantum states (qubits) in quantum circuits has been studied for several decades. Moreover, as discussed, there are many uses for such quantum circuits; some of which exhibit significant advantages over traditional (classical) circuits. However, maintaining the superposition characteristic of such qubits over useful amounts of time in practical environments has been a source of difficulty. One problem is that interactions of the superimposed qubits with other systems can result in an unintentional "measurement" resulting in loss of superposition. Other errors, both deterministic and non-deterministic, may result in the decoherence of qubits or other errors related to their storage. For example, on the deterministic side, gate fidelity issues within the gates of a quantum circuit may result in unwanted "corruption" of a desired quantum operation on a set of qubits. Also, quantum circuits may be effected by other circuits in a system (e.g., through quantum leakage or the like) which could shift or alter neighboring qubits stored in these circuits. The isolation of the qubit itself from external or environmental influence can be quite problematic and may require extreme measures, such as substantial magnetic shielding or sub-absolute-zero cryogenic apparatus, where the possibility of external magnetic fields or infrared radiation from the apparatus itself interacting with the stored qubit is thus minimized.

Thus, it is desirable to create a system or quantum circuits where the quantum state can be maintained for as long as necessary in order to make use of the qubits in subsequent quantum computations or other applications. In other words, it is desirable to have quantum circuits with a longer longitudinal coherence time (e.g., $T_1$ time) and transverse coherence time (e.g., $T_2$ time). In simple terms, the $T_1$ time can be considered the "native" decoherence (or "relaxation") time of the qubit information carrier. In the same vein, the $T_2$ time can be considered to be the overall decoherence time (which also includes the effect of external influences on the qubit carrier). Thus, the difference between the $T_1$ and $T_2$ times can be considered as a relative measure of the system's isolation from the external environment. Other measurements (such as the $T_2^*$ time) may include the effect of neighboring-qubit interference.

Embodiments of the systems, structures and quantum circuits disclosed herein achieve longer $T_1$ or $T_2$ times among other advantages through the continuous regeneration of a particular quantum state by repeatedly evolving the qubit carriers to the desired state and subsequently back to an eigenstate or basis state. In particular, embodiments may comprise a set of cascaded stages with the output of the last linear stage of the circuit being fed back, or provided as input, to the first linear stage in the set of cascaded stages. Because the subsequent states produced by the individual stages differ in a repeatable pattern, a quantum oscillator results wherein the final basis state may be affected by the superimposed state that is desired to be retained in the interior of the apparatus. Since the basis state value may be known (and thus, may be measured without disturbing the superpositioned states), its state may nonetheless also be affected by gate infidelities inherent in the cascade of quantum processing stages required to evolve the qubit back to the basis state. Thus, if the qubit carrier does not fully return to an eigenstate, due to gate fidelity errors in the cascaded circuit, that fact may be measured and appropriate corrective action applied to the circuit. Also, the act of measurement of the basis state output of the cascaded circuit may itself contribute to the correction of the potential gate fidelity errors, which is an application of the so-called "Quantum Zeno Effect". It should be noted that, while the Quantum Zeno Effect may be responsible for correction of some small gate infidelity errors, if the errors are substantial, then they will overwhelm the effect itself and then must be corrected via active measures.

Accordingly, embodiments as disclosed herein provide quantum circuits that repeatedly evolve oscillating qubit basis states over time for single and multiple qubits. These quantum circuits are characterized by continuously regenerating a quantum basis state that oscillates among a subset of different basis states while also evolving any superimposed and entangled states at other points in the circuit. This recirculation allows such quantum preservation circuits to operate in a closed-loop fashion. This permits the application of feedback as well as feedforward analysis and control theory techniques for real-time improvements in operational optimization and stability of the circuit. These quantum coherence preservation circuits or quantum ring oscillators (which will be understood to be interchangeable terms as used herein) may be widely applicable for various functions in a quantum computing system or otherwise. For the purposes of simplicity, embodiments have been described herein with respect to qubits, but it will be noted that the same principles and embodiments described herein can nonetheless be in order to represent qudits (multi-valued quantum data) as well as qubits (binary-valued quantum data).

In one embodiment, a quantum ring oscillator circuit is provided for quantum coherence preservation of single qubit. Specifically, a NOT gate or Pauli-X gate acts on a single qubit. It is the quantum equivalent of the NOT gate for classical computers (with respect to the standard basis $|0\rangle$, $|1\rangle$. It equates to a rotation of the Bloch sphere around the X-axis by $\pi$ radians. It maps $|0\rangle$ to $|1\rangle$ and $|1\rangle$ to $|0\rangle$. It is represented by the Pauli matrix:

$$X = \begin{bmatrix} 0 & 1 \\ 1 & 0 \end{bmatrix}.$$

A square root of NOT gate acts on a single qubit and is represented by a unitary matrix that, multiplied by itself, yields X of the NOT gate:

$$\sqrt{X} = \sqrt{NOT} = \frac{1}{2}\begin{bmatrix} 1+i & 1-i \\ 1-i & 1+i \end{bmatrix}.$$

Accordingly, in one embodiment a quantum coherence preservation circuit that is a single bit oscillator may include two cascaded linear stages, each linear stage comprised of a square root of NOT gate. The two square root of NOT gates that are cascaded with the output of the last square root of NOT gate provided to (or fed back to) the input of the first square root of NOT gate. Specifically, in these embodiments, the output of a first square root of NOT gate may be coupled to a second square root of NOT gate. The output of the second square root of NOT gate is coupled to the input of the first square root of NOT gate. Thus, if the input qubit to the first square root of NOT gate is in a first state, the output of the first square root of NOT gate is a qubit in a second state provided to the second square root of NOT gate, the qubit that is output of the second square root of NOT gate is in a third state, where the third state is the opposite (e.g., NOT) of the first state. The qubit in the third state is then fed back on the output of the second square root of NOT gate to the input of the first square root of NOT gate. After the second pass through this quantum circuit, the qubit will be in the first state again. In other words, the qubit has gone through the equivalent of two NOT gates. In this manner, the state of the qubit is oscillated between the first state and its opposite (e.g., NOT the first state) and can be maintained in the quantum circuit while preserving the first state of the qubit maintained therein (e.g., the state in which the qubit is initially input to the circuit).

In another embodiment, a quantum coherence preservation circuit that is made up of a single qubit oscillator may include cascaded stages, each stage comprising a Hadamard gate. The two Hadamard gates are cascaded with the output of the last Hadamard gate provided to (or fed back to) the input of the first Hadamard gate. Specifically, in these embodiments, the output of a first Hadamard gate may be coupled to a second Hadamard gate. The output of the second Hadamard gate is coupled to the input of the first Hadamard gate. Thus, if the input qubit to the first Hadamard gate is in a first state, the output of the first Hadamard is a qubit in a second state provided to the second Hadamard gate, the qubit that is output of the second Hadamard gate is in a third state, where the third state is equivalent to the first state, since the Hadamard operation is its own inverse. The qubit in the third state equivalent to the first state is then fed back on the output of the second Hadamard gate to the input of the first Hadamard gate. In this manner, the state of the qubit is oscillated between the first and second states (which are equivalent) and can be maintained in the quantum circuit while preserving the first state of the qubit maintained therein (e.g., the state in which the qubit is initially input to the circuit).

Embodiments of quantum circuits that preserve coherence of two or more qubits through the oscillation of states are also disclosed. Certain of these embodiments may feed the output of one or more gates of the quantum circuit to one or more inputs of one or more quantum gates of the quantum circuit. In particular, embodiments as described may utilize a quantum circuit that produces linear combinations of Bell States as output values. Various embodiments of this circuit may involve continuous regeneration or circulation of qubits that undergo successive superposition, entanglement and then decoherence operations. The regenerative nature of this circuit and the recirculation allows the circuit to operate in a closed-loop fashion. This permits the application of feedback as well as feedforward analysis and control theory techniques for real-time improvements in operational optimization and stability of the circuit. Because of its structure (a cascaded set of Bell-State generators) and due to its alternating basis state outputs, the dual qubit embodiment of this kind of regenerative quantum circuit is referred to as a "Bell State Oscillator" (BSO).

Certain embodiments of a BSO as disclosed can be used to generate and preserve a pair of entangled qubits, and thus may be thought of as a qubit storage device or cell that holds a pair of entangled qubits. More specifically, some embodiments of a BSO may continuously generate (or regenerate) and circulate pairs of qubits in a feedback loop. Such a BSO may, for example, include a set of cascaded Bell State generator circuits, with each Bell State generator circuit providing the input to the subsequent Bell State generator circuit, and the output of the final Bell State generator in the chain (which will have evolved back to a basis state) coupled back to the input of the first Bell State generator circuit in the chain.

In one embodiment, a quantum circuit for a dual qubit oscillator may include a BSO having four cascaded linear stages, each linear stage comprising a Bell State generator. More particularly, in one embodiment, a BSO includes a first Bell State generator, comprising a first Hadamard gate and a first CNOT gate, the first Hadamard gate having an input and an output and the first CNOT gate having an input and an output. The BSO also includes a second Bell State generator, comprising a second Hadamard gate and a second CNOT gate, the second Hadamard gate having an input and an output and the second CNOT gate having an input and an output, wherein the input of the second Hadamard gate is coupled to the output of the first Hadamard gate of the first Bell State generator and the input of the second CNOT gate is coupled to the output of the first CNOT gate of the first Bell State generator. The BSO may also include a third Bell State generator, comprising a third Hadamard gate and a third CNOT gate, the third Hadamard gate having an input and an output and the third CNOT gate having an input and an output, wherein the input of the third Hadamard gate is coupled to the output of the second Hadamard gate of the second Bell State generator and the input of the third CNOT gate is coupled to the output of the second CNOT gate of the second Bell State generator. The BSO may further include a fourth Bell State generator, comprising a fourth Hadamard gate and a fourth CNOT gate, the fourth Hadamard gate having an input and an output and the fourth CNOT gate having an input and an output, wherein the input of the fourth Hadamard gate is coupled to the output of the third Hadamard gate of the third Bell State generator and the input of the fourth CNOT gate is coupled to the output of the third CNOT gate of the third Bell State generator, and wherein the input of the first Hadamard gate of the first Bell State generator is coupled to the output of the fourth Hadamard gate of the fourth Bell State generator and the input of the first CNOT gate of the first Bell State generator is coupled to the output of the fourth CNOT gate of the fourth Bell State generator.

Other embodiments of quantum circuits herein may utilize Greenberger, Home and Zeilinger (GHZ) state generators. The GHZ state generator can effectively be considered as a 3-qubit version of the Bell State generator, the output of which is a maximally-entangled qubit triplet (as opposed to the Bell State generator output, which is a maximally entangled qubit pair). One implementation of a GHZ state generator may include a Hadamard gate having an input and an output and a first CNOT gate having an input and an output and controlled by the output of the Hadamard gate and a second CNOT gate having an input and an output and controlled by the output of the Hadamard gate. Thus, an embodiment of a quantum oscillator for three qubits may include a cascaded set of stages, each stage comprising a GHZ stage generator, and may be referred to as a GHZ state oscillator or GSO. Certain embodiments of a GSO as disclosed can be used to generate and preserve three maximally-entangled qubits, and thus may be thought of as a qubit storage device or cell that holds the three entangled qubits, with similar properties as both the single-qubit and dual-qubit oscillator circuits described earlier. More specifically, some embodiments of a GSO may continuously generate (or regenerate) and circulate three qubits in a feedback loop. Such a GSO may, for example, include a set of cascaded GHZ state generators, with each GHZ state generator circuit providing the input to the subsequent GHZ state generator circuit, and the output of the final GHZ state generator in the chain (which will be evolved back to a basis state) coupled back to the input of the first GHZ state generator circuit in the chain.

Specifically, in one embodiment, a GSO may include a first GHZ state generator having a Hadamard gate with an input and an output, a first CNOT gate having an input and an output, the control of the first CNOT gate coupled to the output of the Hadamard gate, and a second first CNOT gate having an input and an output, the control of the second CNOT gate coupled to the output of the Hadamard gate. A second GHZ state generator having is cascaded with the first GHZ state generator. The second GHZ state generator includes a Hadamard gate with an input and an output, a first CNOT gate having an input and an output, the control of the first CNOT gate coupled to the output of the Hadamard gate, and a second CNOT gate having an input and an output, the control of the second CNOT gate coupled to the output of the Hadamard gate. The second GHZ state generator is cascaded with the first GHZ state generator by coupling the output of the first CNOT gate of the first GHZ state generator to the input of the first CNOT gate of the second GHZ state generator, the output of the second CNOT gate of the first GHZ state generator to the input of the second CNOT gate of the second GHZ state generator and the output of the Hadamard gate of the first GHZ state generator to the input of the Hadamard gate of the second GHZ state. A third GHZ state generator is cascaded with the second GHZ state generator and a fourth GHZ state generator is cascaded with the third GHZ state generator in a similar manner. A feedback path of the GSO couples the output of the fourth GHZ state generator to the input of the first GHZ state generator by coupling the output of the first CNOT gate of the fourth GHZ state generator to the input of the first CNOT gate of the first GHZ state generator, the output of the second CNOT gate of the fourth GHZ state generator to the input of the second CNOT gate of the first GHZ state generator and the output of the Hadamard gate of the fourth GHZ state generator to the input of the Hadamard gate of the first GHZ state generator.

In a similar manner, it can be seen that the BSO and GSO structures described earlier can themselves be extended to incorporate further qubits. Thus, if we replace each of the four GHZ State generator stages of the GSO described earlier with their four-qubit counterparts, then the resulting circuit will produce similar results. Specifically, the Bloch sphere rotations of the input qubits will result in a basis state output at the conclusion of the fourth stage in the chain, much like the BSO and GSO circuits. Thus, in order to create larger-sized groups of maximally-entangled qubits, the length of the cascaded chain does not increase.

This overall circuit architecture of four-stage chains of maximally-entangled state generators can thus be seen to represent a method for creating and maintaining larger-sized entangled qubit "words", where the size of the circuit that creates the maximally-entangled qubits grows linearly with the size of the desired entangled qubit word. This linear scaling is in contrast to the quadratic or even exponential growth of circuits that are typically required to produce larger-sized maximally-entangled qubit words. These circuits containing various numbers of 4-stage chains of cascaded maximally-entangled state generators may be referred to a quantum ring oscillators, due to their similarity to classical binary ring oscillator circuits.

Because embodiments of the quantum coherence preservation circuits as discussed operate by oscillating the quantum qubits through a defined set of states, certain types of errors that may decrease quantum coherence time may be effectively measured and then corrected without causing decoherence of the qubit. More specifically, in these embodiments, when a qubit is input to the quantum circuit in a basis state, the input received on the feedback loop will be a defined basis state. Thus, for example, in a quantum circuit for coherence preservation of single qubit using two cascaded square root of NOT gates, if a qubit is input in a basis state (e.g., $|0\rangle$ or $|1\rangle$) the output of the second square root of NOT gate that is fed back to the input of the first square root of NOT gate will be in an opposite basis state (e.g., $|1\rangle$ or $|0\rangle$). As another example, in a quantum circuit for coherence preservation of single qubit using two cascaded Hadamard gates, if a qubit is input in a basis state (e.g., $|0\rangle$ or $|1\rangle$) the output of the second Hadamard gate that is fed back to the input of the first square root of NOT gate will be in the same basis state (e.g., $|0\rangle$ or $|1\rangle$).

Accordingly, by injecting one or more qubits or sequences of qubits in basis states into such a quantum ring oscillator circuit and measuring the state of these qubits on the feedback path of the circuit, deterministic errors in the circuit may be determined and potentially corrected. Specifically, by injecting one or more qubits in a known basis state (which may be referred to as error detection qubits), expected values (e.g., the same or opposite basis state) for those error detection qubits on the feedback path may be determined. Any error (e.g., deviations from the expected value) in these error detection qubits as measured on the feedback path of the quantum ring oscillator circuit are usually due to gate fidelity issues or other deterministic errors. Based on any measured errors determined from the difference between the expected basis state for these error detection qubits and the measured states of the error correction qubits, errors in the quantum ring oscillator circuit (such as phase shift errors or the like) may be determined. Error correction circuitry included in the quantum ring oscillator circuit may apply error correction to the qubit carrier signal path to correct for these measured errors. For example, a deterministic phase shift may be applied to the qubit carrier signal path to correct for these measured errors. Other techniques for error correction in a quantum circuit are known in the art and are fully contemplated herein.

The qubit state is thus cycled back and forth between the initial state and its inverse state. Notably, if the initial state is one where the qubit carrier is in superposition, then the inverse state is similarly in superposition, whereas the intermediate state may be in (or approximately in) a basis or eigenstate. In this manner, if a single qubit in superposition is immediately preceded by and immediately followed by a carrier that is in a basis state, then any gate infidelities inflicted on both of the basis state carriers will most likely also affect the carrier in superposition.

Thus, because of the feedback path included in embodiments of the quantum ring oscillator circuits as disclosed herein, we can use the measured gate infidelities of the basis-state carriers to estimate the errors imposed on the qubit in superposition without either having to measure the qubit (which would cause decoherence) or to interrupt the normal circuit operation and initiate a system calibration cycle.

In other, words, the error correction may be applied by the error correction circuitry in a continuous manner while the quantum circuit is in an operational state (e.g., being used for quantum computation) without disturbing the quantum information being used by the quantum system or taking the quantum circuit or quantum system offline. Moreover, this error determination and correction may take place at certain regular intervals or substantially continuously as the quantum circuit is operating. Thus, as the errors in the quantum ring oscillator circuit change (e.g., as the circuit heats up, the qubit carrier path may lengthen or the coupling between the circuit and its operating environment may change, etc.) the differing or changing errors may be accounted for, and the error correction adjusted. In this manner, it is possible to run real time adjustment of quantum storage circuits to account for deterministic errors and increase the length of time of quantum coherence preservation.

According to some embodiments then, error measurement circuitry may inject or place one or more qubits or patterns of error detection qubits in a known basis state before or after a qubit which is intended to be stored or otherwise maintained in the quantum ring oscillator circuit. This qubit may be referred to as an operational or stored qubit and may be, for example, a qubit used in the performance of generalized quantum computing operations by the quantum circuit or a system that includes the quantum circuit. Any "auxiliary" or "ancilla" error detection qubits may be injected into the feedback loop of the quantum ring oscillator circuit such that they are initially provided in a basis state at the input of the first gate or other quantum structure of the circuit.

In another embodiment, however, in order to better isolate any gate infidelities (between the different stages of the cascaded circuit), the ancilla qubits may potentially be introduced into the feedback system in one or more Bell States; thus causing the circuit to produce basis state intermediate values at any point in the cascade (which can thus be measured at that intermediate point in the interior of the cascade). The error measurement function of the quantum ring oscillator circuit may then determine the expected values (e.g., the same or opposite basis state) for those error detection qubits not only in the feedback path, but at any point along the cascade. The state of these error detection qubits may then be measured and a difference between the measured error detection qubits and the expected value for those error detection qubits determined. Based on this difference, errors in the quantum ring oscillator circuit (such as phase shift errors or the like) may be determined. Error correction circuitry included in the quantum ring oscillator may apply error correction to the qubit carrier signal path to correct for these deterministic errors. For example, a deterministic phase shift may be applied to the qubit carrier signal path to correct for these measured errors.

As it is the error detection qubits that are measured, these measurements and corrections can be made without decohereing or otherwise affecting any operational or stored qubits in the quantum ring oscillator circuit. Since this error correction process is deterministic, then it may be implemented in classical circuitry. Such classical control process is not only simpler to implement than quantum-based processing, it also allows us to take advantage of classical control theory mathematical techniques that have been well-studied and continually improved over the better part of the last century. This control function may also be implemented in electronics-based systems, rather than having to be implemented in the "native" qubit carrier mechanism (.e.g. in photonics). In this way, the error correction applied by classical error correction control circuitry to adjust the quantum ring oscillator serves to counteract the issues that may be caused by the circuit's gate infidelities and thus, to increase the overall coherence time of any such operational or stored qubits in the circuit.

Additionally, such error correction may be performed repeatedly, or substantially continuously, utilizing the same error detection qubits after they have passed through the circuit one or more times. This multi-pass error correction mechanism will allow for the correction of smaller gate infidelity errors than may be normally detectable, since the errors would be cumulative. As the initial basis state of these error detection qubits is known, the expected values for these error detection qubits at any given point (e.g., after a given number of passes through the closed-loop circuit) may be measured and used to estimate the deterministic errors in the quantum ring oscillator circuit. The control circuitry can then apply higher-precision error correction to adjust for this longer-term cumulative determined error. As before, such error correction can be applied and adjusted in real-time to the qubit carrier signal path while the quantum circuit is in an on-line or operational state without decohereing or otherwise affecting any operational or stored qubits in the circuit, serving to greatly increase the coherence time of those operational or stored qubits.

While deterministic errors may be accounted for according to certain embodiments, it may be difficult to account for non-deterministic errors. For example, in quantum circuits implemented using photonic information carriers, one non-deterministic error is photonic loss. Over time, the chance or probability that a photon will interact with any atom in the overall data path and cause the qubit to decohere increases. However, it is impossible in a quantum circuit to utilize repeaters as are typically used with in fibre channel or the like, as the use of such repeaters would cause the qubit to decohere. Moreover, the no-cloning theorem states that it is impossible to create an identical copy of an arbitrary unknown quantum state.

Embodiments as disclosed herein may help to determine the statistical likelihood of the possibility of such non-deterministic errors, including the particular issue of photonic loss. By implementing such online error measurements, the operational characteristics of the circuit may be analyzed in real time to help determine the statistical probability of photonic loss while the circuit is in operation. In the case where the average lifetime of a photonic carrier in the circuit is known in real time, then further optimizations to the circuit may potentially be applied that can help to lengthen the average time between photonic loss events. This kind of optimization may further increase the coherence time of stored qubits as well as giving approximate measurements of the probability that a given photonic carrier has not been absorbed, even though this measurement would clearly not give a definite indication whether or not a particular photon has been absorbed or scattered. However, even if the measurement only give a range of probabilities of photonic loss, this is nonetheless highly useful information.

In the case where the photonic qubit carrier is used to represent an externally-supplied qubit, we transfer that external qubit to the local circuit by initiating a controlled swap of quantum states between one photon carrying an external qubit and another (locally-sourced) photon. By swapping the state of the external qubit to a different photon (e.g., a local photon), we can detect that the local photon's state may have changed if it is entangled with other local photons. If this is accomplished correctly (i.e., using qubit clusters), then we can be assured that the external qubit information has been transferred to the local circuit without causing decoherence of the external qubit. This quantum state swap may be accomplished using a number of mechanisms.

In one embodiment, for example, a Fredkin gate may be used to couple two quantum ring oscillator circuits, a process which we will refer to as "qubit injection". A qubit may be injected onto a first quantum ring oscillator circuit and the success of the qubit transfer confirmed. Then, after a number of cycles of this qubit around the first of the quantum oscillator circuit, the qubit may then be transferred to a different quantum ring oscillator, where the success of the transfer may then again be determined. In this way, although we may not be able to prevent loss of the qubit information due to photonic loss, we may nonetheless be able to determine whether or not the information has actually been lost without measuring it.

Thus, embodiment of the quantum circuits as disclosed herein provide systems a for evolving the quantum states of one or more qubits in a deterministic and repeating fashion such that the time interval required for them to maintain coherence is minimized, thus decreasing the likelihood that decoherence or unintentional observations occur. Additionally, such quantum circuits may provide the capability to measure or otherwise utilize qubits that oscillate among basis states without disturbing the coherency of the quantum state in other portions of the structure and to provide a convenient means for the injection and extraction of the quantum information carriers without disturbing or destroying the functionality of the system or any system that incorporates such quantum circuits.

Moreover, embodiments of these quantum circuits for the preservation of coherence of one or more qubits may be easily utilized as supporting subcircuits in other systems. In addition to the application of their use as, for example, a synchronization circuit, additional operators (or their inverses) may be added in the feedforward portion of the structure to cause intentional and arbitrary quantum states to be continuously regenerated. Such a quantum state storage capability is significant since quantum storage is a fundamental requirement in many quantum information processing designs. The overall state of the oscillators can be observed by measuring the extracted qubit without affecting other internal quantum states.

In one embodiment, a system for the quantum coherence preservation of a qubit, can include a quantum oscillator including a plurality of cascaded stages, each stage including a quantum circuit having an input and an output and adapted to evolve a qubit between a first state on the input and a second state on the output wherein the stages are cascaded such that the input of one stage is coupled to the output of a previous stage and the input of the first stage is coupled to the output of the last stage to form a feedback circuit path. The system may also include error correction circuitry coupled to the feedback circuit path of the quantum oscillator and adapted to apply a deterministic error correction to the quantum oscillator based on a difference between a measured state of an error detection qubit in the quantum oscillator and an expected state of the error detection qubit.

In an embodiment, the quantum circuit for each stage is a square root of NOT gate.

In another embodiment, the quantum circuit for each state is a Hadamard gate

In some embodiments, the quantum oscillator includes a Bell State oscillator (BSO), including a first stage, second stage, third stage and fourth stage. The first stage may comprise a first Bell State generator, including a first Hadamard gate and a first CNOT gate, the first Hadamard gate having an input and an output and the first CNOT gate having an input and an output. The second stage comprises a second Bell State generator, including a second Hadamard gate and a second CNOT gate, the second Hadamard gate having an input and an output and the second CNOT gate having an input and an output, wherein the input of the second Hadamard gate is coupled to the output of the first Hadamard gate of the first Bell State generator and the input of the second CNOT gate is coupled to the output of the first CNOT gate of the first Bell State generator.

A third stage of this embodiment may comprise comprising a third Bell State generator, including a third Hadamard gate and a third CNOT gate, the third Hadamard gate having an input and an output and the third CNOT gate having an input and an output, wherein the input of the third Hadamard gate is coupled to the output of the second Hadamard gate of the second Bell State generator and the input of the third CNOT gate is coupled to the output of the second CNOT gate of the second Bell State generator. A fourth stage comprises a fourth Bell State generator, including a fourth Hadamard gate and a fourth CNOT gate, the fourth Hadamard gate having an input and an output and the fourth CNOT gate having an input and an output, wherein the input of the fourth Hadamard gate is coupled to the output of the third Hadamard gate of the third Bell State generator and the input of the fourth CNOT gate is coupled to the output of the third CNOT gate of the third Bell State generator, and wherein the feedback circuit path is formed from the coupling of the input of the first Hadamard gate of the first Bell State generator to the output of the fourth Hadamard gate of the fourth Bell State generator and the coupling of the input of the first CNOT gate of the first Bell State generator to the output of the fourth CNOT gate of the fourth Bell State generator.

In another embodiment, the quantum oscillator includes a Greenberger, Home and

Zeilinger (GHZ) state oscillator including a first stage, second stage, third stage and fourth stage. The first stage comprises a first GHZ state generator, including a first Hadamard gate, a first CNOT gate and a second CNOT gate, the first Hadamard gate having an input and an output, the first CNOT gate having an input and an output and the second CNOT gate having an input and an output. A second stage comprises a second GHZ state generator, including a second Hadamard gate, a third CNOT gate and a fourth CNOT gate, the second Hadamard gate having an input and an output, the third CNOT gate having an input and an output, and the fourth CNOT gate having an input and an output, wherein the input of the second Hadamard gate is coupled to the output of the first Hadamard gate of the first GHZ state generator, the input of the third CNOT gate is coupled to the output of the second CNOT gate of the first GHZ state generator and the input of the fourth CNOT gate is coupled to the output of the second CNOT gate of the first GHZ state generator.

A third stage of the embodiment comprises a third GHZ state generator, including a third Hadamard gate, a fifth CNOT gate and a sixth CNOT gate, the third Hadamard gate having an input and an output, the fifth CNOT gate having an input and an output and the sixth CNOT gate having an input and an output, wherein the input of the third Hadamard gate is coupled to the output of the second Hadamard gate of the second GHZ state generator, the input of the fifth CNOT gate is coupled to the output of the third CNOT gate of the second GHZ state generator and the input of the sixth CNOT gate is coupled to the output of the fourth CNOT gate of the second GHZ state generator. A fourth stage comprises a fourth GHZ state generator, including a fourth Hadamard gate, a seventh CNOT gate, and an eighth CNOT gate, the fourth Hadamard gate having an input and an output, the seventh CNOT gate having an input and an output, and the eighth CNOT gate having an input and an output, wherein the input of the fourth Hadamard gate is coupled to the output of the third Hadamard gate of the third GHZ state generator, the input of the seventh CNOT gate is coupled to the output of the fifth CNOT gate of the third GHZ state generator, and the input of the eighth CNOT gate is coupled to the output of the sixth CNOT gate of the third GHZ state generator, and wherein the feedback circuit path is formed from the coupling of the input of the first Hadamard gate of the first GHZ state generator to the output of the fourth Hadamard gate of the fourth GHZ state generator, the coupling of the input of the first CNOT gate of the first GHZ state generator to the output of the seventh CNOT gate of the fourth GHZ state generator, and the coupling of the input of the second CNOT gate of the first Bell State generator to the output of the eighth CNOT gate of the fourth GHZ state generator.

In a particular embodiment, a system for the quantum coherence preservation of a qubit includes a first quantum oscillator and a second quantum oscillator. The first quantum oscillator comprises a first plurality of cascaded stages, each stage including a first quantum circuit having an input and an output and adapted to evolve a qubit between a first state on the input and a second state on the output wherein the stages are cascaded such that the input of one stage is coupled to the output of a previous stage to form a first feedforward circuit path and the input of the first stage is coupled to the output of the last stage to form a first feedback circuit path. The second quantum oscillator comprises a second plurality of cascaded stages, each stage including a second quantum circuit having an input and an output and adapted to evolve a qubit between a first state on the input and a second state on the output wherein the stages are cascaded such that the input of one stage is coupled to the output of a previous stage to form a second feedforward circuit path and the input of the first stage is coupled to the output of the last stage to form a second feedback circuit path. The system may also include a Fredkin gate coupling the first feedforward circuit path of the first quantum oscillator and the second feedforward circuit path of the second quantum oscillator.

In other embodiments, the system may include error correction circuitry coupled to the first feedback circuit path of the first quantum oscillator or the second feedback circuit path of the second quantum oscillator and adapted to apply a deterministic error correction to the first quantum oscillator or the second quantum oscillator based on a difference between a measured state of an error detection qubit in the first quantum oscillator or the second quantum oscillator and an expected state of the error detection qubit.

In one embodiment, the first quantum oscillator may be a different type of quantum oscillator than the second type of quantum oscillator. For example, each of the first quantum oscillator or second quantum oscillator may be one of a quantum oscillator where the quantum circuits of the quantum oscillator include a square root of NOT gate, a Hadamard gate, a Bell State generator or a GHZ state generator.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in detail, it may be helpful to give a general overview of certain aspects pertaining to embodiments. As may be recalled from the above discussion, one of the main problems with quantum computing, however, is the implementation of qubits themselves. More specifically, the scale at which qubits are implemented means that any perturbations in the qubit caused by unwanted interactions with the environment may result in quantum decoherence. Qubit decoherence is thus a major obstacle to the useful implementation of quantum computing. Exacerbating the problem is the fact that when several qubits are placed in close proximity to one another they can mutually interfere with each other and, thereby, affect adjacent qubits. Sometimes this mutual interference may be a desired effect, but when it is not, it may introduce considerable complexities in the quantum circuit in order to try to isolate or counteract its effects.

Accordingly, there is a need to for systems and method that can preserve coherence of one or more qubits. To that end, embodiments of the systems, structures and quantum circuits disclosed herein achieve longer T1 or T2 times among other advantages through the continuous regeneration of a particular quantum state by repeatedly evolving one or more qubits to the desired state and subsequently back to an eigenstate or other state. Because the subsequent states differ in a repeatable pattern, a quantum oscillator results wherein the intermediate quantum state is the particular superimposed state that is desired to be retained. Accordingly, embodiments as disclosed herein provide quantum circuits that repeatedly evolve oscillating qubit basis states over time for single and multiple qubits. Embodiments of these quantum circuits are characterized by continuously regenerating a quantum basis state that oscillates among a subset of different basis states while also evolving superimposed or entangled states at other points in the circuit.

Figure 1A:
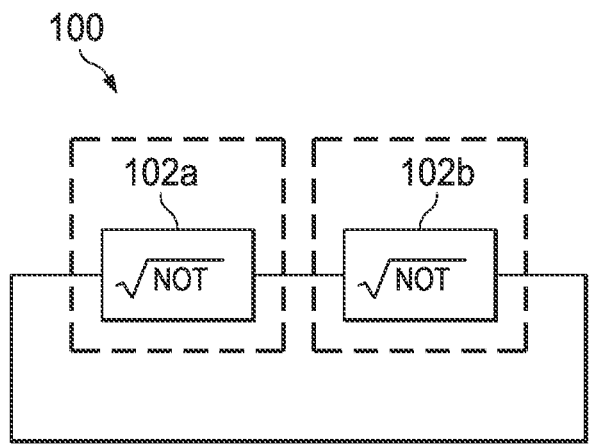
FIG. 1A is a block diagram of an embodiment a single qubit quantum ring oscillator circuit.

Turning now to FIG. 1A, one embodiment of a quantum circuit for the preservation of coherence of a single qubit is depicted. Specifically, a NOT gate or Pauli-X gate acts on a single qubit. It is the quantum equivalent of the NOT gate for classical computers (with respect to the standard basis $|0\rangle$, $|1\rangle$. It equates to a rotation of the Bloch sphere around the X-axis by it radians. It maps $|0\rangle$ to $|1\rangle$ and $|1\rangle$ to $|0\rangle$. It is represented by the Pauli matrix:

$$X = \begin{bmatrix} 0 & 1 \\ 1 & 0 \end{bmatrix}.$$

A square root of NOT gate acts on a single qubit and is represented by a unitary matrix that, multiplied by itself, yields X of the NOT gate:

$$\sqrt{X} = \sqrt{NOT} = \frac{1}{2}\begin{bmatrix} 1+i & 1-i \\ 1-i & 1+i \end{bmatrix}.$$

Accordingly, in one embodiment quantum coherence preservation circuit 100 that is a single bit oscillator may include two square root of NOT gates 102 that are cascade with the output of the last square root of NOT gate 120b provided to (or fed back to) the input of the first square root of NOT gate 102a. Specifically, in these embodiments, the output of a first square root of NOT gate 102a may be coupled to the input of second square root of NOT gate 120b. The output of the second square root of NOT gate 102b is coupled to the input of the first square root of NOT gate 102a. Thus, if a qubit input to the first square root of NOT gate 102a is in a first state, the output of the first square root of NOT gate 102b is the qubit in a second state provided to the input of second square root of NOT gate 102b. The qubit that is the output of the second square root of NOT gate 102b is in a third state, where the third state is the opposite (e.g., NOT) of the first state. The qubit in the third state is then fed back on the output of the second square root of NOT gate 102b to the input of the first square root of NOT gate 102a. After the second pass through this quantum circuit 100, the qubit will be in the first state again. In other words, the qubit has gone through the equivalent of two NOT gates after the second pass through the circuit 100. In this manner, the state of the qubit is oscillated between the first state and its opposite (e.g., NOT the first state) and can be maintained in the quantum circuit while preserving the first state of the qubit maintained therein (e.g., the state in which the qubit is initially input to the circuit).

It can be seen, then, with respect to quantum coherence preservation circuit 100 that a qubit input to first square root of NOT gate 102a in a basis state (e.g., $|0\rangle$ or $|1\rangle$) will be in a superimposed state between the output of the first square root of NOT gate 102a and the input of the second square root of NOT gate 102b. After passing through the second square root of NOT gate 102b, when the qubit is output from the second square root of NOT gate 102b and fed back to the input of the first square root of NOT gate 102a it will be in an opposite basis state (e.g., $|1\rangle$ or $|0\rangle$). Similarly, after a second pass through the cascaded circuit, the qubit will be in the original basis state (e.g., $|1\rangle$ or $|0\rangle$). Thus, a qubit input to the quantum ring oscillator circuit 100 in a basis state will alternate between basis states with each pass through the cascaded circuit 100.

Figure 1B:
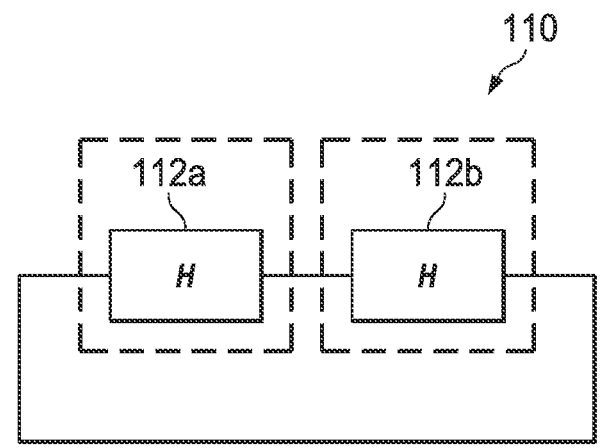
FIG. 1B is a block diagram of an embodiment of a single qubit quantum ring oscillator circuit.

Moving to FIG. 1B, another embodiment of a quantum circuit for the preservation of coherence of a single qubit is depicted. Here, a quantum circuit 110 that is a single qubit oscillator may include two Hadamard gates 112 that are cascaded, with the output of the last Hadamard gate 112b provided to (or fed back to) the input of the first Hadamard gate 112a. A Hadamard gate acts on a single qubit. It maps the basis state $|0\rangle$ to $$\frac{|0\rangle + |1\rangle}{\sqrt{2}} \text{ and } |1\rangle \text{ to } \frac{|0\rangle - |1\rangle}{\sqrt{2}},$$

which means that a measurement will have equal probabilities to become 1 or 0 (i.e., it creates a superposition). It represents a rotation of $\pi$ about the axis $(\hat{x}+\hat{z})/\sqrt{2}$. Equivalently, it is the combination of two rotations, $\pi$ about the X-axis followed by $$\frac{\pi}{2}$$

about the Y-axis. It is represented by the Hadamard matrix:

$$H = \frac{1}{\sqrt{2}}\begin{bmatrix} 1 & 1 \\ 1 & -1 \end{bmatrix}.$$

Specifically, in one embodiment, the output of a first Hadamard gate 112a may be coupled to the input of a second Hadamard gate 112b. The output of the second Hadamard gate 112b is coupled to the input of the first Hadamard gate 112a. Thus, if the input qubit to the first Hadamard gate 112a is in a first state, the output of the first Hadamard gate 112a is a qubit in a second state provided to the input of the second Hadamard gate 112b, and the qubit that is output from the second Hadamard gate 112b is in a third state, where the third state is equivalent to the first state. The qubit in the third state equivalent to the first state is then fed back on the output of the second Hadamard gate 112b to the input of the first Hadamard gate. In this manner, the state of the qubit is oscillated between the first and second states and can be maintained in the quantum circuit while preserving the first state of the qubit maintained therein (e.g., the state in which the qubit is initially input to the circuit).

It can be seen here with respect to circuit 110 that a qubit input to first Hadamard gate 112a in an initial basis state (e.g., $|0\rangle$ or $|1\rangle$) will be in a superimposed state between the output of the first Hadamard gate 112a and the input of the second Hadamard gate 112b. After passing through the second Hadamard gate 112b, when the qubit is output from the second Hadamard gate 112b and fed back to the input of the first Hadamard gate 112a it will again be in the initial basis state (e.g., $|0\rangle$ or $|1\rangle$). Thus, a qubit input to the circuit 110 in a basis state will oscillate between an initial basis state, a superimposed state and the initial basis state with each pass through the circuit 110.

Embodiments of quantum circuits that preserve the coherence of two qubits will now be discussed. In particular, embodiments as described may utilize a quantum circuit that produces linear combinations of Bell States as output values. Various embodiments of this circuit may involve continuous regeneration or circulation of qubits that undergo successive superposition, entanglement and then decoherence operations. The regenerative nature of this circuit and the recirculation allows the circuit to operate in a closed-loop fashion. This permits the application of feedback as well as feedforward analysis and control theory techniques for real-time improvements in operational optimization and stability of the circuit.

As some context, two qubits that are entangled and in a state of superposition are said to be in one of four different Bell States if their respective quantum state vector has the form:

$$|\Phi^+\rangle = \frac{1}{\sqrt{2}}(|00\rangle + |11\rangle)$$

$$|\Phi^-\rangle = \frac{1}{\sqrt{2}}(|00\rangle - |11\rangle)$$

$$|\Psi^+\rangle = \frac{1}{\sqrt{2}}(|01\rangle + |10\rangle)$$

$$|\Psi^-\rangle = \frac{1}{\sqrt{2}}(|01\rangle - |10\rangle)$$

Figure 2A:
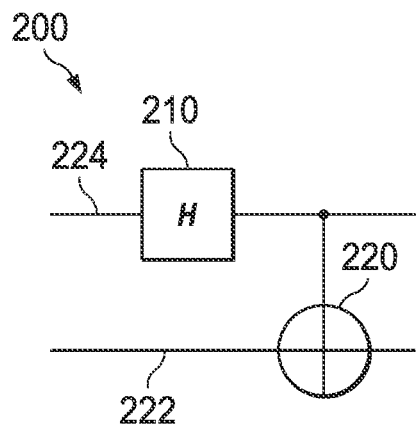
FIG. 2A is a block diagram of a Bell State generator.

A quantum Bell State can be created with two elementary quantum operations consisting of a Hadamard gate followed with a controlled-NOT (CNOT) operation. The resulting Bell State generator 200 is depicted in FIG. 2A using the notation of e.g., [DiV:98] and includes Hadamard gate 210 having an input 224, the output of which is used to control CNOT gate 220 on the control input of the CNOT gate 220 with input 222 and output 225. If the input qubits (222, 224) are initialized to a basis state of $|0\rangle$ or $|1\rangle$ before they are sent to the circuit input, then they are evolved into a Bell State by the quantum circuit 200 in FIG. 2A.

The transfer matrix for the Bell State generator in FIG. 2A is denoted as B and is computed as follows:

$$B = \begin{bmatrix} 1 & 0 & 0 & 0 \\ 0 & 1 & 0 & 0 \\ 0 & 0 & 0 & 1 \\ 0 & 0 & 1 & 0 \end{bmatrix} \left( \frac{1}{\sqrt{2}} \begin{bmatrix} 1 & 1 \\ 1 & -1 \end{bmatrix} \otimes \begin{bmatrix} 1 & 0 \\ 0 & 1 \end{bmatrix} \right) = \frac{1}{\sqrt{2}} \begin{bmatrix} 1 & 0 & 1 & 0 \\ 0 & 1 & 0 & 1 \\ 0 & 1 & 0 & -1 \\ 1 & 0 & -1 & 0 \end{bmatrix}$$

Consider the case where the qubit pair are initialized and then represented as $|\alpha\rangle$ and $|\beta\rangle$. The initial quantum state can then be represented as:

$$|\alpha\rangle \oplus |\beta\rangle = |\alpha\beta\rangle$$

The four Bell States that are obtained using the Bell State generator circuit are theoretically computed as $B|\alpha\beta\rangle$ when $|\alpha\beta\rangle$ is initialized to $|00\rangle$, $|01\rangle$, $|10\rangle$, or $|11\rangle$. As an example:

$$B|\alpha\beta\rangle =$$

$$B|00\rangle = \frac{1}{\sqrt{2}} \begin{bmatrix} 1 & 0 & 1 & 0 \\ 0 & 1 & 0 & 1 \\ 0 & 1 & 0 & -1 \\ 1 & 0 & -1 & 0 \end{bmatrix} \begin{bmatrix} 1 \\ 0 \\ 0 \\ 0 \end{bmatrix} = \frac{1}{\sqrt{2}} \begin{bmatrix} 1 \\ 0 \\ 0 \\ 1 \end{bmatrix} = \frac{1}{\sqrt{2}}(|00\rangle + |11\rangle) = |\Phi^+\rangle$$

$$B|\alpha\beta\rangle = B|01\rangle =$$

$$\frac{1}{\sqrt{2}} \begin{bmatrix} 1 & 0 & 1 & 0 \\ 0 & 1 & 0 & 1 \\ 0 & 1 & 0 & -1 \\ 1 & 0 & -1 & 0 \end{bmatrix} \begin{bmatrix} 0 \\ 1 \\ 0 \\ 0 \end{bmatrix} = \frac{1}{\sqrt{2}} \begin{bmatrix} 0 \\ 1 \\ 1 \\ 0 \end{bmatrix} = \frac{1}{\sqrt{2}}(|01\rangle + |10\rangle) = |\Psi^+\rangle$$

$$B|\alpha\beta\rangle = B|10\rangle = \frac{1}{\sqrt{2}} \begin{bmatrix} 1 & 0 & 1 & 0 \\ 0 & 1 & 0 & 1 \\ 0 & 1 & 0 & -1 \\ 1 & 0 & -1 & 0 \end{bmatrix} \begin{bmatrix} 0 \\ 0 \\ 1 \\ 0 \end{bmatrix} =$$

$$\frac{1}{\sqrt{2}} \begin{bmatrix} 1 \\ 0 \\ 0 \\ -1 \end{bmatrix} = \frac{1}{\sqrt{2}}(|00\rangle - |11\rangle) = |\Phi^-\rangle$$

$$B|\alpha\beta\rangle = B|11\rangle = \frac{1}{\sqrt{2}} \begin{bmatrix} 1 & 0 & 1 & 0 \\ 0 & 1 & 0 & 1 \\ 0 & 1 & 0 & -1 \\ 1 & 0 & -1 & 0 \end{bmatrix} \begin{bmatrix} 0 \\ 0 \\ 0 \\ 1 \end{bmatrix} =$$

$$\frac{1}{\sqrt{2}} \begin{bmatrix} 0 \\ 1 \\ -1 \\ 0 \end{bmatrix} = \frac{1}{\sqrt{2}}(|01\rangle - |10\rangle) = |\Psi^-\rangle$$

Figure 2B:
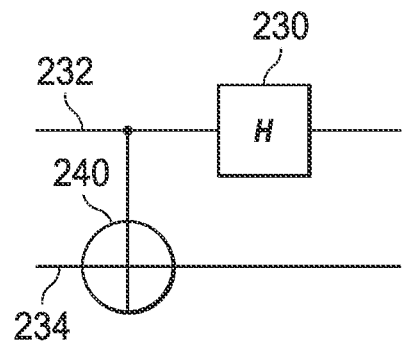
FIG. 2B is a block diagram of a reverse Bell State generator.

A quantum circuit similar to the Bell State generator of FIG. 2A where the quantum operations are reversed in order (and whose transfer matrix is denoted as R) is depicted in FIG. 2B. Here, the qubit input to Hadamard gate 230 on line 232 is used to control the operation of CNOT gate 240 on an input qubit on line 234.

Figure 3A:
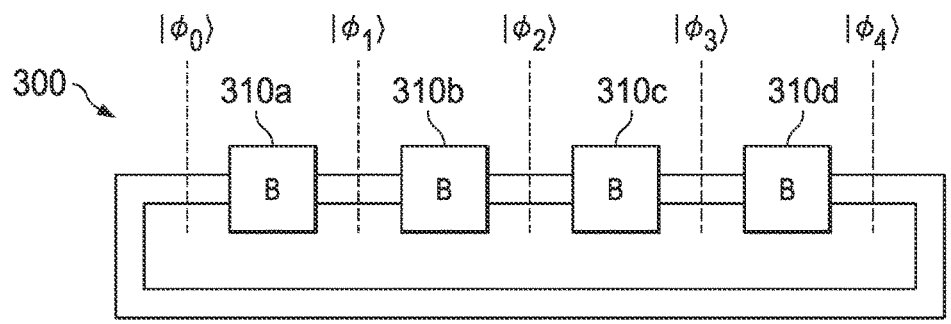
FIG. 3A is a block diagram of an embodiment of a dual qubit quantum ring oscillator circuit, known as a Bell State Oscillator (BSO).
Figure 3B:
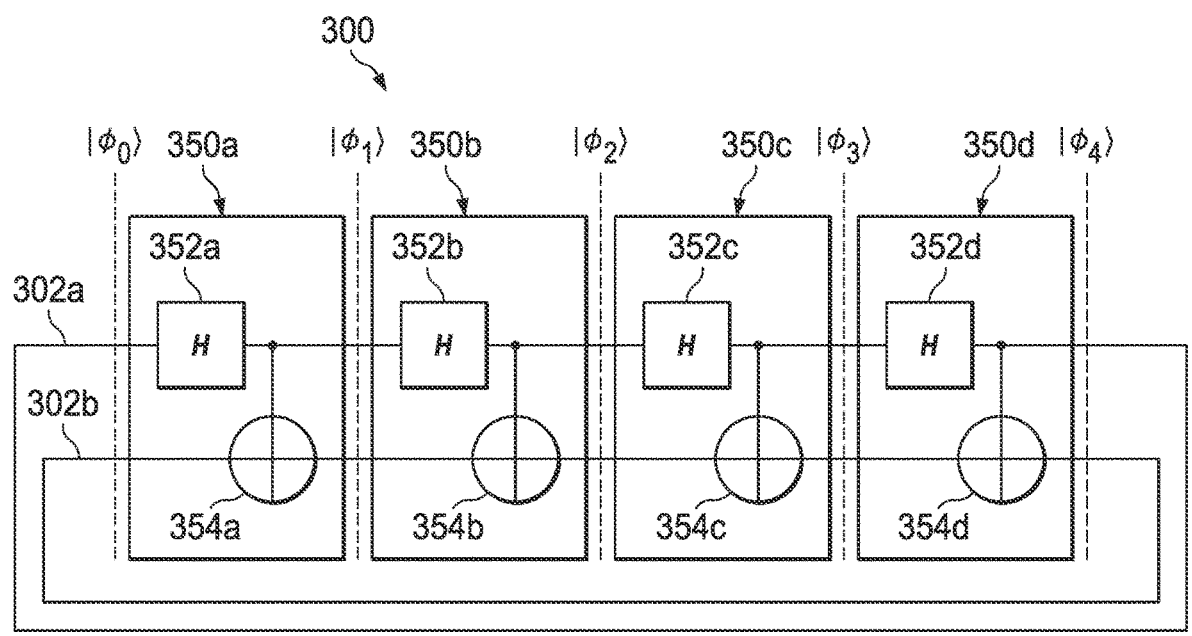
FIG. 3B is a block diagram of an embodiment of a dual qubit quantum ring oscillator circuit, known as a BSO.

Moving to FIG. 3A, a logic block diagram for one embodiment of a quantum preservation circuit for two qubits referred to as a Bell State Oscillator (BSO) is depicted. An embodiment of a corresponding quantum circuit for the embodiment of FIG. 3A is depicted in FIG. 3B. Here, the BSO 300 is a quantum circuit comprising a cascade or chain of four quantum circuits 310 (e.g., 310a, 310b, 310c and 310d), each quantum circuit 310 characterized by B (e.g., each having a transfer matrix equivalent to a Bell State generator as discussed) wherein the evolved output qubit pair from the cascade is in a feedback arrangement (e.g., the output of circuit 310d is provided as feedback into the input of circuit 310a). Such a feedback configuration is possible since the quantum state after the evolution through four consecutive B circuits 310 is an eigenstate. The injection of the initial $|\alpha\beta\rangle$ basis state pair on input lines 302a, 302b may be provided as the input to circuit 310a and will be the basis state pair $|\phi_0\rangle$.

This embodiment of the BSO 300 may be comprised of four Bell State generators 350 (e.g., 350a, 350b, 350c, 350d) with the circuit path between Bell State generators 350a and 350d forming a feedforward circuit path and a feedback circuit path of feedback loop connecting the outputs of the chain to the inputs of the chain as depicted in FIG. 3B. In other words, the outputs of one Bell State generator 350 may be provided as the corresponding inputs to a previous Bell State generator 350 in the cascade or chain. Specifically, for example, in the embodiment depicted the output of Hadamard gate 352d of Bell State generator 350d is provided as input on line 302a to Hadamard gate 352a of Bell State generator 350a and the output of CNOT gate 354d of Bell State generator 350d is provided as input on line 302b to CNOT gate 354a of Bell State generator 350a. Furthermore, the BSO 300 is initialized by injecting a qubit pair Iap) on the input lines 302a, 302b at the quantum circuit state indicated by the dashed line denoted as $|\phi_0\rangle$. After the initialization of $|\phi_0\rangle$ and the BSO evolved states $|\phi_0\rangle$, $|\phi_2\rangle$, and $|\phi_3\rangle$, the quantum state $|\phi_4\rangle$ evolves to an eigenstate or basis state. The quantum states $|\phi_1\rangle$, $|\phi_2\rangle$, and $|\phi_3\rangle$ are referred to as "intermediate quantum states" and the resulting basis state $|\phi_4\rangle$ as the "feedback quantum state". Different quantum state vector evolutions are depicted with a dashed line denoted as $|\phi_0\rangle$, $|\phi_1\rangle$, $|\phi_2\rangle$, $|\phi_3\rangle$, and $|\phi_4\rangle$.

After the initialization of $|\phi_0\rangle$ (note that the quantum state $|\phi_0\rangle = |\phi_4\rangle$ due to the feedback structure) of the depicted embodiment, the intermediate quantum states $|\phi_1\rangle$, $|\phi_2\rangle$ and $|\phi_3\rangle$ are entangled and superimposed qubit pairs. When $|\phi_0\rangle = |00\rangle$, then $|\phi_4\rangle = |01\rangle$, a basis state. Alternatively, when $|\phi_0\rangle = |01\rangle$, then $|\phi_4\rangle = |00\rangle$, a basis state. Thus, the sequence of subsequent quantum states $|\phi_0\rangle$ (or, $|\phi_4\rangle$), oscillates between $|00\rangle$ and $|01\rangle$. However, one point of novelty of embodiments of the BSO is that the intermediate quantum states $|\phi_1\rangle$, $|\phi_2\rangle$, and $|\phi_3\rangle$ are qubit pairs that are entangled and superimposed. In fact, these intermediate states are linear combinations of Bell States. Alternatively, when $|\phi_0\rangle = |10\rangle$, then the resulting $|\phi_4 = 11\rangle$, and both are also and likewise, basis states. This oscillatory behavior is indicated through the following analysis.

Assuming $|\alpha\beta\rangle = |\phi_0\rangle = |00\rangle$, we can analyze the evolved quantum state vectors as $|\phi_1\rangle = B|\phi_0\rangle$, $|\phi_2\rangle = B^2|\phi_0\rangle$, $|\phi_3\rangle = B^3|\phi_0\rangle$, and $|\phi_4\rangle = B^4|\phi_0\rangle$. Thus, the oscillatory behavior is observed using the $B^4$ transfer matrix.

$$B^4 = \left(\frac{1}{\sqrt{2}}\right)^4 \begin{bmatrix} 1 & 0 & 1 & 0 \\ 0 & 1 & 0 & 1 \\ 0 & 1 & 0 & -1 \\ 1 & 0 & -1 & 0 \end{bmatrix}^4 = \begin{bmatrix} 0 & 1 & 0 & 0 \\ 1 & 0 & 0 & 0 \\ 0 & 0 & 0 & 1 \\ 0 & 0 & 1 & 0 \end{bmatrix}$$

It is noted that $B^4$ is a simple permutation matrix. Assuming that $|\alpha\beta\rangle = |\phi_0\rangle = |00\rangle$, the $B^4$ transfer matrix may be used to illustrate the oscillatory behavior with various initialized $|\alpha\beta\rangle = |\phi_0\rangle$ basis states.

$$B^4|00\rangle = \begin{bmatrix} 0 & 1 & 0 & 0 \\ 1 & 0 & 0 & 0 \\ 0 & 0 & 0 & 1 \\ 0 & 0 & 1 & 0 \end{bmatrix}\begin{bmatrix} 1 \\ 0 \\ 0 \\ 0 \end{bmatrix} = \begin{bmatrix} 0 \\ 1 \\ 0 \\ 0 \end{bmatrix} = |01\rangle$$

$$B^4|01\rangle = \begin{bmatrix} 0 & 1 & 0 & 0 \\ 1 & 0 & 0 & 0 \\ 0 & 0 & 0 & 1 \\ 0 & 0 & 1 & 0 \end{bmatrix}\begin{bmatrix} 0 \\ 1 \\ 0 \\ 0 \end{bmatrix} = \begin{bmatrix} 1 \\ 0 \\ 0 \\ 0 \end{bmatrix} = |00\rangle$$

$$B^4|10\rangle = \begin{bmatrix} 0 & 1 & 0 & 0 \\ 1 & 0 & 0 & 0 \\ 0 & 0 & 0 & 1 \\ 0 & 0 & 1 & 0 \end{bmatrix}\begin{bmatrix} 0 \\ 0 \\ 1 \\ 0 \end{bmatrix} = \begin{bmatrix} 0 \\ 0 \\ 0 \\ 1 \end{bmatrix} = |11\rangle$$

$$B^4|11\rangle = \begin{bmatrix} 0 & 1 & 0 & 0 \\ 1 & 0 & 0 & 0 \\ 0 & 0 & 0 & 1 \\ 0 & 0 & 1 & 0 \end{bmatrix}\begin{bmatrix} 0 \\ 0 \\ 0 \\ 1 \end{bmatrix} = \begin{bmatrix} 0 \\ 0 \\ 1 \\ 0 \end{bmatrix} = |10\rangle$$

One aspect of BSO 300 is that the intermediate states of the circuit labeled as $|\phi_1\rangle$, $|\phi_2\rangle$, and $|\phi_3\rangle$ are comprised of qubit pairs that are entangled in various states of superposition. These intermediate states are computed using B, $B^2$, and $B^3$ transfer matrices that yield the intermediate states $|\phi_1\rangle$, $|\phi_2\rangle$, and $|\phi_3\rangle$ respectively. Finally, it is noted that the intermediate states are all linear combinations of the various Bell States, $|\Phi^+\rangle$, $|\Phi^-\rangle$, $|\psi^+\rangle$, and $|\psi^-\rangle$. Therefore, the BSO 300 cycles through various linear combinations of Bell States for the intermediate quantum states and a basis state in the initialization or feedback states.

$$B = \frac{1}{\sqrt{2}}\begin{bmatrix} 1 & 0 & 1 & 0 \\ 0 & 1 & 0 & 1 \\ 0 & 1 & 0 & -1 \\ 1 & 0 & -1 & 0 \end{bmatrix}, B^2 = \frac{1}{2}\begin{bmatrix} 1 & 1 & 1 & -1 \\ 1 & 1 & -1 & 1 \\ -1 & 1 & 1 & 1 \\ 1 & -1 & 1 & 1 \end{bmatrix},$$

$$B^3 = \frac{1}{\sqrt{2}}\begin{bmatrix} 0 & 1 & 1 & 0 \\ 1 & 0 & 0 & 1 \\ 0 & 1 & -1 & 0 \\ 1 & 0 & 0 & -1 \end{bmatrix}$$

The following four examples contain the calculations that yield the intermediate quantum states $|\phi_1\rangle$, $|\phi_2\rangle$, and $|\phi_3\rangle$ when the BSO is initialized with all four possible basis state pairs for $|\alpha\beta\rangle = |\phi_0\rangle$.

EXAMPLE 1: Initialize $|\phi_0\rangle = |00\rangle$:

$|\phi_1\rangle =$ $$B|00\rangle = \frac{1}{\sqrt{2}}\begin{bmatrix} 1 & 0 & 1 & 0 \\ 0 & 1 & 0 & 1 \\ 0 & 1 & 0 & -1 \\ 1 & 0 & -1 & 0 \end{bmatrix}\begin{bmatrix} 1 \\ 0 \\ 0 \\ 0 \end{bmatrix} = \frac{1}{\sqrt{2}}\begin{bmatrix} 1 \\ 0 \\ 0 \\ 1 \end{bmatrix} = \frac{1}{\sqrt{2}}(|00\rangle + |11\rangle) = |\Phi^+\rangle$$

$$|\phi_2\rangle = B^2|00\rangle = \frac{1}{2}\begin{bmatrix} 1 & 1 & 1 & -1 \\ 1 & 1 & -1 & 1 \\ -1 & 1 & 1 & 1 \\ 1 & -1 & 1 & 1 \end{bmatrix}\begin{bmatrix} 1 \\ 0 \\ 0 \\ 0 \end{bmatrix} =$$

$$\frac{1}{2}\begin{bmatrix} 1 \\ 1 \\ -1 \\ 1 \end{bmatrix} = \frac{1}{\sqrt{2}}(|00\rangle + |01\rangle - |10\rangle + |11\rangle) = \frac{1}{\sqrt{2}}(|\Phi^+\rangle + |\Psi^-\rangle)$$

$$|\phi_2\rangle = B^3|00\rangle = \frac{1}{\sqrt{2}}\begin{bmatrix} 0 & 1 & 1 & 0 \\ 1 & 0 & 0 & 1 \\ 0 & 1 & -1 & 0 \\ 1 & 0 & 0 & -1 \end{bmatrix}\begin{bmatrix} 1 \\ 0 \\ 0 \\ 0 \end{bmatrix} = \frac{1}{\sqrt{2}}\begin{bmatrix} 0 \\ 1 \\ 0 \\ 1 \end{bmatrix} = \frac{1}{\sqrt{2}}(|01\rangle + |11\rangle) =$$

$$\frac{1}{2}(|\Phi^+\rangle - |\Phi^-\rangle + |\Psi^+\rangle + |\Psi^-\rangle)$$

EXAMPLE 2: Initialize $|\phi_0\rangle = |01\rangle$:

$|\phi_1\rangle =$ $$B|01\rangle = \frac{1}{\sqrt{2}}\begin{bmatrix} 1 & 0 & 1 & 0 \\ 0 & 1 & 0 & 1 \\ 0 & 1 & 0 & -1 \\ 1 & 0 & -1 & 0 \end{bmatrix}\begin{bmatrix} 0 \\ 1 \\ 0 \\ 0 \end{bmatrix} = \frac{1}{\sqrt{2}}\begin{bmatrix} 0 \\ 1 \\ 1 \\ 0 \end{bmatrix} = \frac{1}{\sqrt{2}}(|01\rangle + |10\rangle) = |\Psi^+\rangle$$

$$|\phi_2\rangle = B^2|01\rangle = \frac{1}{2}\begin{bmatrix} 1 & 1 & 1 & -1 \\ 1 & 1 & -1 & 1 \\ -1 & 1 & 1 & 1 \\ 1 & -1 & 1 & 1 \end{bmatrix}\begin{bmatrix} 0 \\ 1 \\ 0 \\ 0 \end{bmatrix} =$$

$$\frac{1}{2}\begin{bmatrix} 1 \\ 1 \\ -1 \\ 1 \end{bmatrix} = \frac{1}{2}(|00\rangle + |01\rangle - |10\rangle + |11\rangle) = \frac{1}{\sqrt{2}}(|\Phi^+\rangle + |\Psi^-\rangle)$$

$$|\phi_2\rangle = B^3|01\rangle = \frac{1}{\sqrt{2}}\begin{bmatrix} 0 & 1 & 1 & 0 \\ 1 & 0 & 0 & 1 \\ 0 & 1 & -1 & 0 \\ 1 & 0 & 0 & -1 \end{bmatrix}\begin{bmatrix} 0 \\ 1 \\ 0 \\ 0 \end{bmatrix} =$$

$$\frac{1}{\sqrt{2}}\begin{bmatrix} 1 \\ 0 \\ 1 \\ 0 \end{bmatrix} = \frac{1}{\sqrt{2}}(|00\rangle + |10\rangle) = \frac{1}{2}(|\Phi^+\rangle - |\Phi^-\rangle + |\Psi^+\rangle + |\Psi^-\rangle)$$

EXAMPLE 3: Initialize $|\phi_0\rangle = |10\rangle$:

$|\phi_1\rangle =$ $$B|10\rangle = \frac{1}{\sqrt{2}}\begin{bmatrix} 1 & 0 & 1 & 0 \\ 0 & 1 & 0 & 1 \\ 0 & 1 & 0 & -1 \\ 1 & 0 & -1 & 0 \end{bmatrix}\begin{bmatrix} 0 \\ 0 \\ 1 \\ 0 \end{bmatrix} = \frac{1}{\sqrt{2}}\begin{bmatrix} 1 \\ 0 \\ 0 \\ -1 \end{bmatrix} = \frac{1}{\sqrt{2}}(|00\rangle - |11\rangle) = |\Phi^-\rangle$$

$$|\phi_2\rangle = B^2|10\rangle = \frac{1}{2}\begin{bmatrix} 1 & 1 & 1 & -1 \\ 1 & 1 & -1 & 1 \\ -1 & 1 & 1 & 1 \\ 1 & -1 & 1 & 1 \end{bmatrix}\begin{bmatrix} 0 \\ 0 \\ 1 \\ 0 \end{bmatrix} =$$

$$\frac{1}{2}\begin{bmatrix} 1 \\ -1 \\ 1 \\ 1 \end{bmatrix} = \frac{1}{2}(|00\rangle - |01\rangle + |10\rangle + |11\rangle) = \frac{1}{\sqrt{2}}(|\Phi^+\rangle - |\Psi^-\rangle)$$

$$|\phi_2\rangle = B^3|10\rangle = \frac{1}{\sqrt{2}}\begin{bmatrix} 0 & 1 & 1 & 0 \\ 1 & 0 & 0 & 1 \\ 0 & 1 & -1 & 0 \\ 1 & 0 & 0 & -1 \end{bmatrix}\begin{bmatrix} 0 \\ 0 \\ 1 \\ 0 \end{bmatrix} = \frac{1}{\sqrt{2}}\begin{bmatrix} 1 \\ 0 \\ -1 \\ 0 \end{bmatrix} =$$

$$\frac{1}{\sqrt{2}}(|00\rangle - |10\rangle) = \frac{1}{2}(|\Phi^+\rangle - |\Phi^-\rangle - |\Psi^+\rangle + |\Psi^-\rangle)$$

EXAMPLE 4: Initialize $|\phi_0\rangle = |11\rangle$:

$|\phi_1\rangle =$ $$B|11\rangle = \frac{1}{\sqrt{2}}\begin{bmatrix} 1 & 0 & 1 & 0 \\ 0 & 1 & 0 & 1 \\ 0 & 1 & 0 & -1 \\ 1 & 0 & -1 & 0 \end{bmatrix}\begin{bmatrix} 0 \\ 0 \\ 0 \\ 1 \end{bmatrix} = \frac{1}{\sqrt{2}}\begin{bmatrix} 0 \\ 1 \\ -1 \\ 0 \end{bmatrix} = \frac{1}{\sqrt{2}}(|01\rangle - |10\rangle) = |\Psi^-\rangle$$

$$|\phi_2\rangle = B^2|11\rangle = \frac{1}{2}\begin{bmatrix} 1 & 1 & 1 & -1 \\ 1 & 1 & -1 & 1 \\ -1 & 1 & 1 & 1 \\ 1 & -1 & 1 & 1 \end{bmatrix}\begin{bmatrix} 0 \\ 0 \\ 0 \\ 1 \end{bmatrix} =$$

$$\frac{1}{2}\begin{bmatrix} -1 \\ 1 \\ 1 \\ 1 \end{bmatrix} = \frac{1}{2}(|01\rangle - |00\rangle + |10\rangle + |11\rangle) = \frac{1}{\sqrt{2}}(|\Psi^+\rangle - |\Phi^-\rangle)$$

$$|\phi_2\rangle = B^3|11\rangle = \frac{1}{\sqrt{2}}\begin{bmatrix} 0 & 1 & 1 & 0 \\ 1 & 0 & 0 & 1 \\ 0 & 1 & -1 & 0 \\ 1 & 0 & 0 & -1 \end{bmatrix}\begin{bmatrix} 0 \\ 0 \\ 0 \\ 1 \end{bmatrix} =$$

$$\frac{1}{\sqrt{2}}\begin{bmatrix} 0 \\ 1 \\ 0 \\ -1 \end{bmatrix} = \frac{1}{\sqrt{2}}(|01\rangle - |11\rangle) = \frac{1}{2}(|\Phi^-\rangle - |\Phi^+\rangle + |\Psi^+\rangle + |\Psi^-\rangle)$$

As can be seen then, embodiments of BSOs as illustrated herein exhibit oscillatory behavior. Although in this embodiment, the output of Bell State generator 350d is provided as input to Bell State generator 350a on input lines 302a, 302b, other embodiments are possible. Thus, in this embodiment quantum state $|\phi_4\rangle$ is provided as feedback from the output of Bell State generator 350d as the input basis state $|\phi_0\rangle$ to Bell State generator 350a. However, the output of Bell State generator 350c may be provided as input to Bell State generator 350b. Thus, in this embodiment quantum state (e.g., $|\phi_3\rangle$) would be provided as feedback as quantum state (e.g., $|\phi_1\rangle$) to Bell State generator 350b. The operation of such a circuit would be somewhat different than that of the embodiment shown in FIGS. 3A and 3B, however the principal concept of a quantum/basis state feedback-based system can be considered the same for both circuits.

As described previously, embodiments of a BSO as disclosed herein continually regenerate entangled EPR pairs through the recirculation of qubit pairs in basis states. It has also been disclosed and shown herein that dependent upon the particular basis state of $|\alpha\beta\rangle = |\phi_0\rangle$, different Bell States are achieved for $|\phi_1\rangle$. These were demonstrated in the Examples 1 through 4 as discussed above. In particular, the previous analysis showed that one embodiment of a BSO has two distinct steady states based upon the qubit pair initialization state, $|\phi_0\rangle$. When $|\phi_0\rangle = |00\rangle$ or $= |01\rangle$, $|\phi_1\rangle$ alternatively exists in either $|\Phi^+\rangle$ or $|\Psi^+\rangle$, both being fundamental Bell States. Likewise, when $|0_0\rangle = |10\rangle$ or $= |11\rangle$, $|\phi_1\rangle$ alternatively exists in either $|\Phi^-\rangle$ or $|\Psi^-\rangle$, that are also fundamental Bell States.

These two steady states of embodiments of a BSO are distinct and different as can be observed from the overall transfer matrix structure of $B^4$ (as shown above) since the first and third quadrants or submatrices correspond to transfer functions of a NOT gate, yielding a quantum circuit with behavior analogous to that of a conventional ring oscillator composed of an odd number of electronic digital logic inverter gates. The transfer matrix for $B^4$ is reproduced below with the quadrant partitions indicated by the 2×2 all zero matrix denoted as [0] and the 2×2 transfer matrix for the single qubit operator, NOT, denoted as [N]. Thus, depending upon the initialization quantum state $|\phi_0\rangle$, embodiments of a BSO operate in accordance to the top or the bottom portion of the $B^4$ transfer matrix.

$$B^4 = \begin{bmatrix} 0 & 1 & 0 & 0 \\ 1 & 0 & 0 & 0 \\ 0 & 0 & 0 & 1 \\ 0 & 0 & 1 & 0 \end{bmatrix} = \begin{bmatrix} N & 0 \\ 0 & N \end{bmatrix}$$

One of the two steady state values of $|\phi4\rangle$ is either $|01\rangle$ or $|10\rangle$ depending upon the steady state of the BSO. It is noted that these two $|\phi4\rangle$ basis states, each arising from one of the two different steady states of the BSO, are simple permutations of one another. Other aspects of embodiments such as these may be understood with reference to U.S. patent application Ser. No. 15/832,285 entitled "System and Method for Quantum Coherence Preservation of Qubits", by Oxford et al, filed Dec. 5, 2017 which is hereby incorporated by reference in its entirety.

It will be noted that other embodiments of multiple qubit quantum ring oscillator circuits may employ other quantum gates in the individual cascaded stages.

Embodiments of quantum circuits that preserve the coherence of three qubits will now be discussed. Again, various embodiments of this circuit may involve continuous regeneration or circulation of qubits that undergo successive superposition, entanglement and then decoherence operations. The regenerative nature of this circuit and the recirculation allows the circuit to operate in a closed-loop fashion. This permits the application of feedback as well as feedforward analysis and control theory techniques for real-time improvements in operational optimization and stability of the circuit.

Figure 4:
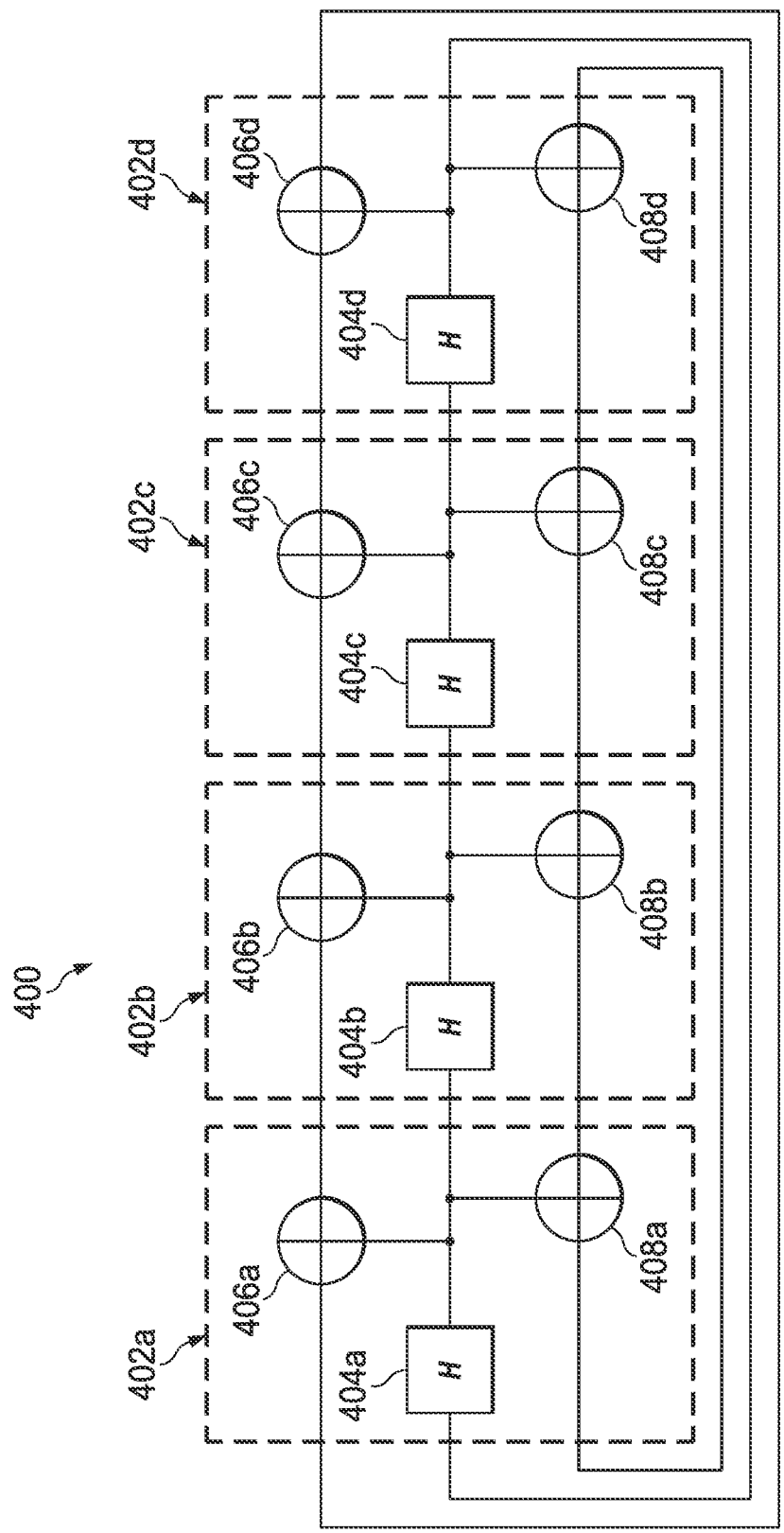
FIG. 4 is a block diagram of an embodiment of a triple qubit quantum ring oscillator circuit, known as a GHZ state oscillator (GSO).

Looking now at FIG. 4, one embodiment of a quantum circuit for preserving the coherence of three qubits is depicted. Quantum preservation circuit 400 utilizes cascaded Greenberger, Horne and Zeilinger (GHZ) state generators 402. Each GHZ state generator 402 may include a Hadamard gate 404 having an input and an output and a first CNOT gate 406 having an input and an output and controlled by the output of the Hadamard gate 404, and a second CNOT gate 408 having an input and an output and controlled by the output of the Hadamard gate 404. Thus, quantum preservation circuit 400 that may function as a quantum oscillator for three qubits may include a cascaded set of GHZ state generators 402 and may be referred to as a GHZ state oscillator or GSO.

Certain embodiments of a GSO can be used to generate and preserve three entangled qubits, and thus may be thought of as a qubit storage device or cell that holds the three of entangled qubits. More specifically, some embodiments of a GSO may continuously generate (or regenerate) and circulate three qubits in a feedback loop. Such a GSO 400 may, for example, include a set of cascaded GHZ state generators 402, with each GHZ state generator circuit 402 providing the input to the subsequent GHZ state generator circuit 402, and the output of the final GHZ state generator in the chain 402d coupled back to the input of the first GHZ state generator circuit in the chain 402a.

Specifically, in one embodiment, GSO 400 may include a first GHZ state generator 402a having a Hadamard gate 404a with an input and an output, a first CNOT gate 406a having an input and an output and a control coupled to the output of the Hadamard gate 404a, and a second first CNOT gate 408a having an input and an output, and a control coupled to the output of the Hadamard gate 404a. A second GHZ state generator 402b is cascaded with the first GHZ state generator 402a. The second GHZ state generator 402b includes a Hadamard gate 404b with an input and an output, a first CNOT gate 406b having an input and an output and a control coupled to the output of the Hadamard gate 404b, and a second CNOT gate 408b having an input and an output, and a control coupled to the output of the Hadamard gate 404b.

The second GHZ state generator 402b is cascaded with the first GHZ state generator 402a by coupling the output of the first CNOT gate 406a of the first GHZ state generator 402a to the input of the first CNOT gate 406b of the second GHZ state generator 402b, the output of the second CNOT gate 408a of the first GHZ state generator 402a to the input of the second CNOT gate 408b of the second GHZ state generator 402b and the output of the Hadamard gate 404a of the first GHZ state generator 402a to the input of the Hadamard gate 404b of the second GHZ state generator 402b.

A third GHZ state generator is cascaded with the second GHZ state generator and a fourth GHZ state generator is cascaded with the third GHZ state generator in a similar manner. Specifically, the third GHZ state generator 402c is cascaded with the second GHZ state generator 402b by coupling the output of the first CNOT gate 406b of the second GHZ state generator 402b to the input of the first CNOT gate 406c of the third GHZ state generator 402c, the output of the second CNOT gate 408b of the second GHZ state generator 402b to the input of the second CNOT gate 408c of the third GHZ state generator 402c and the output of the Hadamard gate 404b of the second GHZ state generator 402b to the input of the Hadamard gate 404c of the third GHZ state generator 402c.

Similarly, the fourth GHZ state generator 402d is cascaded with the third GHZ state generator 402c by coupling the output of the first CNOT gate 406c of the third GHZ state generator 402c to the input of the first CNOT gate 406d of the fourth GHZ state generator 402d, the output of the second CNOT gate 408c of the third GHZ state generator 402c to the input of the second CNOT gate 408d of the fourth GHZ state generator 402d and the output of the Hadamard gate 404b of the third GHZ state generator 402c to the input of the Hadamard gate 404d of the fourth GHZ state generator 402d. In this manner, the circuit path between GHZ state generators 402a and 402d forms a feedforward circuit path of GSO 400.

A feedback path of the GSO 400 couples the output of the fourth GHZ state generator 402d to the input of the first GHZ state generator 402a by coupling the output of the first CNOT gate 406d of the fourth GHZ state generator 402d to the input of the first CNOT gate 406a of the first GHZ state generator 402a, the output of the second CNOT gate 408d of the fourth GHZ state generator 402d to the input of the second CNOT gate 408a of the first GHZ state generator 402a and the output of the Hadamard gate 404d of the fourth GHZ state generator 402d to the input of the Hadamard gate 404a of the first GHZ state generator.

Thus, if three qubits are injected into a GSO quantum coherence preservation circuit 400 with one qubit being on the circuit path coupling first CNOT gates 406 of each GHZ sate generators 402, a second qubit on the circuit path coupling the second CNOT gates 408 of each GHZ sate generators 402 and a third qubit on the circuit path coupling the Hadamard gates 404 of each GHZ state generators 402.

The evolution of the qubit triplets through each individual GHZ stage of the GSO can be characterized as per the following:

$$G = \frac{1}{\sqrt{2}} \begin{bmatrix} 1 & 0 & 1 & 0 & 0 & 0 & 0 & 0 \\ 0 & 1 & 0 & 1 & 0 & 0 & 0 & 0 \\ 0 & 0 & 0 & 0 & 0 & 1 & 0 & -1 \\ 0 & 0 & 0 & 0 & 1 & 0 & -1 & 0 \\ 0 & 0 & 0 & 0 & 1 & 0 & 1 & 0 \\ 0 & 0 & 0 & 0 & 0 & 1 & 0 & 1 \\ 0 & 1 & 0 & -1 & 0 & 0 & 0 & 0 \\ 1 & 0 & -1 & 0 & 0 & 0 & 0 & 0 \end{bmatrix}$$

Thus, when connected in a cascaded manner (as with the BSO), the cumulative (open loop) transfer function for the GSO can be seen to be:

$$G_3^4 = \begin{bmatrix} 0 & 0 & 0 & 0 & 0 & 1 & 0 & 0 \\ 0 & 0 & 0 & 1 & 0 & 0 & 0 & 0 \\ 0 & 0 & 0 & 0 & 0 & 0 & 0 & 1 \\ 0 & 0 & 0 & 0 & 0 & 0 & 1 & 0 \\ 0 & 1 & 0 & 0 & 0 & 0 & 0 & 0 \\ 1 & 0 & 0 & 0 & 0 & 0 & 0 & 0 \\ 0 & 0 & 0 & 1 & 0 & 0 & 0 & 0 \\ 0 & 0 & 1 & 0 & 0 & 0 & 0 & 0 \end{bmatrix}$$

Thus, the overall transfer function of the four-stage cascade collapses to a simple permutation matrix. Thus, if we apply the transfer function above to the complete series of possible 3-qubit basis state inputs, we can observe that the closed-loop circuit will oscillate in a substantially similar manner to the BSO circuit:

$$G_3^4|000\rangle = |101\rangle$$
$$G_3^4|100\rangle = |001\rangle$$
$$G_3^4|001\rangle = |100\rangle$$
$$G_3^4|101\rangle = |000\rangle$$
$$G_3^4|010\rangle = |111\rangle$$
$$G_3^4|110\rangle = |011\rangle$$
$$G_3^4|011\rangle = |110\rangle$$
$$G_3^4|111\rangle = |010\rangle$$

It should be remarked that, in the notation introduced above, the "3" subscript represents the fact that the transfer function matrix shown above is valid for a three-qubit system. As we will discuss later, the motivation for this subscript is that the same mathematical treatment of four cascaded stages of any number of similarly-connected multiple-qubit systems (i.e., not just 2 or 3 qubits) will produce the same kind of oscillatory behavior, regardless of the number of parallel qubit data paths.

As described previously, embodiments of a GSO as disclosed herein continually regenerate maximally-entangled qubit triplets by means of the recirculation of these qubits though the cascaded GHZ state generators. Thus, the circuit described operates by cycling the qubit carriers into and out of eigenstates. A quantum circuit with similar structure may also be used to maximally entangle groups of four qubits.

As can be seen then, the function of maximizing qubit decoherence time may be provided through the use of generalized quantum ring oscillators including a cascaded set of stages (such as Bell State generators, GHZ generators, etc.), where each cascaded stage includes a Hadamard gate and a set of CNOT gates each coupled to the output of the Hadamard gate. An overall closed-circuit path for one or more qubits can be formed by the coupling of the output of each Hadamard gate in each stage to the corresponding Hadamard gate in the next stage in the cascaded circuit, with the output of the Hadamard gate in the last stage coupled to the input of the Hadamard gate of the first stage in the set of cascaded stages. Feedback paths for one or more additional qubits are formed by coupling the output of a corresponding CNOT gate in each linear stage to the corresponding CNOT gate in the next linear stage in the cascaded set of linear stages, with the output of the CNOT gate in the last linear stage coupled to the input of the corresponding CNOT gate of the first linear stage in the set of cascaded set of linear stages For quantum coherence preservation of two or more bits then, the capability of the circuit to store an additional qubit may be accomplished by adding another CNOT gate to each stage, where the control of the CNOT gate is coupled to the Hadamard gate of the stage and the corresponding CNOT gates of each stage are coupled to form a feedback circuit path for the added qubit. Again, the feedback circuit path is formed by the coupling of the output of each CNOT gate to the corresponding CNOT gate in the next stage in the cascaded set of generators, with the output of the CNOT gate in the last stage coupled to the input of the corresponding CNOT gate of the first stage in the set of cascaded set of stages.

As may be noticed, one advantage of embodiments as depicted herein, is that the number of gates in such quantum ring oscillator circuits may scale linearly with the number of qubits which such circuits can preserve. This can be contrasted directly with other quantum circuits which circuitry scales exponentially (e.g., $O(N^2)$ or $O(N^3)$) with the number of qubits. As another advantage, in certain embodiments, the qubits within such quantum ring oscillator circuits may be entangled. As such, they may be well suited for implementing or storing words of qubits, as the qubits of words must usually be entangled to preform quantum computing operations utilizing such words of qubits.

Moreover, because embodiments of the quantum coherence preservation circuits as discussed operate by oscillating the quantum qubits through a defined set of states, certain types of errors that may decrease quantum coherence time may be effectively dealt with. More specifically, in these embodiments, when a qubit is input to the quantum circuit in a basis state, the input received on the feedback loop will be a defined basis state. Thus, for example, in a quantum circuit for coherence preservation of single qubit using two cascaded square root of NOT gates as depicted in FIG. 1A, if a qubit is input to the first square root of NOT gate in a basis state (e.g., $|0\rangle$ or $|1\rangle$) the output of the second square root of NOT gate that is fed back to the input of the first square root of NOT gate will be in an opposite basis state (e.g., $|1\rangle$ or $|1\rangle$). As another example using the circuit of FIG. 1B, in a quantum circuit for coherence preservation of a single qubit using two cascaded Hadamard gates, if a qubit is input in a basis state (e.g., $|0\rangle$ or $|1\rangle$) the output of the second Hadamard gate that is fed back to the input of the first square root of NOT gate will be in the same basis state (e.g., $|0\rangle$ or $|1\rangle$).

Accordingly, by injecting one or more qubits or sequences of qubits in basis states into such a quantum coherence preservation circuit and measuring the state of these qubits on the feedback path of the circuit, deterministic errors in the circuit's signal path may be measured and potentially corrected. Specifically, by injecting one or more qubits in a known basis state (which may be referred to as error detection or ancilla qubits), expected values (e.g., the same or opposite basis state) for those error detection qubits on the feedback path may be determined. Any error (e.g., deviations from the expected value) in these error detection qubits as measured on the feedback path of the circuit are usually due to gate fidelity issues or other deterministic errors. Based on any measured errors determined from the difference between the expected basis state for these error detection qubits and the measured states of the error correction qubits, deterministic errors in the quantum carrier signal path (such as phase shift errors or the like) may be determined.

Error correction circuitry included in the quantum ring oscillator circuit may apply error correction to the circuit to correct for these determined errors. For example, a deterministic phase shift may be applied to the quantum carrier signal path to correct for these measured errors. Other techniques for error correction in a quantum circuit are known in the art and are fully contemplated herein.

Importantly, because of the feedback path included in embodiments of the quantum ring oscillator circuits as disclosed herein, this error correction may take place without altering any of the quantum information (e.g., other qubits) that are being preserved or otherwise stored or run through the quantum circuit. In other, words, the error correction may be applied by the error correction circuitry when the quantum circuit is in an operational state (e.g., being used for quantum computation) without disturbing the quantum information being used by the quantum system or taking the quantum circuit or quantum system offline. Moreover, this error determination and correction may take place at certain regular intervals or substantially continuously as the quantum circuit is operating. Thus, as the errors in the circuit changes (e.g., as the overall circuit heats up, the quantum carrier signal path lengthens, the operating environment changes, etc.) the differing or changing errors may be accounted for, and the error correction adjusted. Again, such error correction may be accomplished while the quantum circuit is in an operational state. In this manner, it is possible to run real time adjustment of quantum storage circuits to account for deterministic errors and increase the length of time of quantum coherence preservation.

According to some embodiments then, error measurement circuitry may inject or place one or more qubits or patterns of error detection qubits in a known basis state before or after a qubit which is intended to be stored or otherwise maintained in the quantum ring oscillator circuit. This qubit may be referred to as an operational or stored qubit and may be, for example, a qubit used in the performance of quantum computing operations by the quantum circuit or a system that includes the quantum circuit. These error detection qubits may be injected into the feedback loop of the quantum coherence preservation circuit such that they are initially provided at the input of the first gate or other quantum structure of the circuit. The error measurement circuitry of the circuit may then determine the measured values (e.g., the same or opposite basis state) for those error detection qubits on the feedback path. These error detection qubit measurements may be used within a classical control system and a difference between the measured error detection qubits and the expected value for those error detection qubits determined. Based on this difference, methods for optimally correcting errors in the quantum coherence preservation circuit (such as phase shift errors or the like) may be determined. Error correction circuitry included in the quantum preservation circuit may apply such error correction to the quantum coherence preservation circuit to correct for these determined errors. For example, a deterministic phase shift may be applied to the quantum coherence preservation circuit to correct for these measured errors.

As it is only the error detection qubits that are measured, these measurements and corrections can be made without decohereing or otherwise affecting any operational or stored qubits in the circuit. However, the error correction applied by the control circuitry to adjust the quantum circuit may serve to increase the decoherence time of any such operational or stored qubits in the circuit.

Additionally, this error correction may take place again at a later point, or effected cumulatively or substantially continuously in the same manner. For example, such error measurement may be performed repeatedly, or substantially continuously, utilizing the same error detection qubits after they have passed through the quantum coherence preservation circuit one or more additional times. Although a single pass through the circuit may not be easily correctable (which may depend on the precision of the deterministic error correction mechanism), the cumulative error of the qubit carrier may be more easily corrected after multiple passes through the loop. As the initial basis state of these error detection qubits is known, the expected values for these error detection qubits at any given point (e.g., after a given number of passes through the quantum coherence preservation circuit) may be determined and used to determine the errors in the quantum coherence preservation circuit. The error correction circuitry can then apply error correction to adjust for this newly determined error. Thus, error correction can be applied and adjusted in real-time to the quantum circuit while it is in an on-line or operational state without decohereing or otherwise affecting any operational or stored qubits in the loop, serving to greatly increase the coherence time of those operational or stored qubits.

Figure 5:
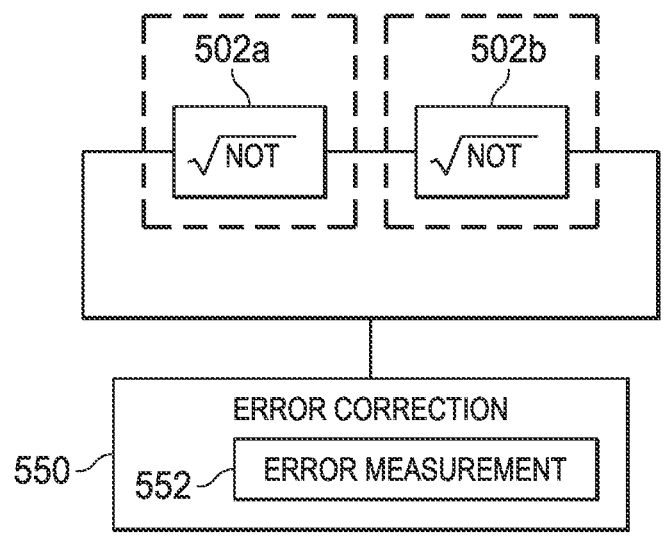
FIG. 5 is a block diagram of a single qubit oscillator with error correction circuitry.

Moving now to FIG. 5, one embodiment of a quantum coherence preservation circuit including error correction circuitry is depicted. It will be noted here, that while this embodiment depicts a quantum ring oscillator circuit with a single feedback circuit path, error correction circuitry as discussed may be utilized with equal efficacy with embodiments of such circuits with multiple feedback paths for multiple qubits. Here, the quantum circuit 500 that is a single bit oscillator may include two square root of NOT gates 502 that are cascaded, with the output of the last square root of NOT gate 502b provided to (or fed back to) the input of the first square root of NOT gate 502a. The quantum circuit also includes error correction circuitry 550. Error correction circuitry 550 includes error measurement circuitry 552 adapted to inject or place one or more error detection qubits or patterns of error detection qubits in a known basis state before or after a stored qubit maintained in the quantum coherence preservation circuit 500. Error correction circuitry 550 may be coupled to the feedback path of the quantum circuit 500 such that these error detection qubits may be injected into the feedback loop and initially provided at the input of the first square root of NOT gate 502a. The error measurement circuitry 552 of the quantum circuit 500 may then determine the expected states (e.g., the same or opposite basis state) for those error detection qubits on the feedback path after a number of circuits of the feedback path.

Error measurement circuitry 552 may then measure the state of these one or more error detection qubits (e.g., after a determined number of trips around the feedback circuit, after every trip around the feedback circuit, etc.) and determine a difference between the measured error detection qubits and the expected value for those error detection qubits. Based on this difference, error measurement circuitry 552 may determine an error in the quantum coherence preservation circuit 500 (such as phase shift errors or the like). Error correction circuitry 500 may apply error correction to the quantum coherence preservation circuit to correct or otherwise account for these determined errors. For example, error correction circuitry 500 may apply a deterministic phase shift to one or more gates of the quantum coherence preservation circuit 500 to correct for these measured errors.

While deterministic errors may be accounted for according to certain embodiments, it may be difficult to account for non-deterministic errors. For example, in quantum circuits implemented using photons, one non-deterministic error is photonic loss. Over time the chance or probability that a photon (e.g., a photon being used as a qubit carrier) will interact with a carrier and cause the qubit to decohere increases. However, it is impossible in a quantum circuit to utilize repeaters as are typically used with in fibre channel or the like, as the use of such repeaters would cause the qubit to decohere. Moreover, the no-cloning theorem states that it is impossible to create an identical copy of an arbitrary unknown quantum state.

Embodiments as disclosed herein may thus deal with the possibility of such non-deterministic errors, including the issue of photonic loss, to further increase the coherence time of stored qubits by making a controlled swap of states between a photon carrying a qubit and another photon. By swapping the state of the qubit to a relatively newer (e.g., a photon that has passed through a quantum circuit a fewer number of times) photon at certain intervals, the problem of photonic loss may be reduced, further increasing the coherence time of qubits in such quantum circuits.

In one embodiment, for example, a Fredkin gate may be used to couple two quantum coherence preservation circuits. A Fredkin gate is a three-qubit gate that uses a control input to determine whether the other two inputs have their respective quantum states interchanged or not. Mathematically, the transfer matrix for the Fredkin gate is expressed as the 8×8 matrix F where the quantum state is denoted as |cxy⟩ with |c⟩ serving as the "control" qubit. When |c⟩ =|1⟩ , the superimposed state of |x⟩ is exchanged with that of |y⟩ and when |c⟩ =|0⟩ , both |x⟩ and |y⟩ pass through the Fredkin gate with their states of superposition remaining unchanged. In Dirac's braket notation, F is expressed in the following equation with the particular swapping cases of interest emphasized through the use of italics $$F=|000\rangle\langle 000|+|001\rangle\langle 001|+|010\rangle\langle 010|+|011\rangle\langle 011|$$
$$\langle 001|+|100\rangle\langle 100|+|110\rangle\langle 101|+|101|$$
$$\langle 110|+|111\rangle\langle 111|$$

In more traditional linear algebraic notation, the transfer function for F is expressed as:

$$F = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 0 & 0 & 1 & 0 & 0 \\ 0 & 0 & 0 & 0 & 0 & 0 & 0 & 1 \end{bmatrix}$$

Figure 6A:
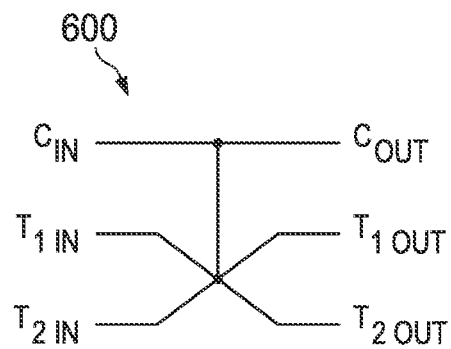
FIG. 6A is a schematic block diagram of a Fredkin gate.
Figure 6B:
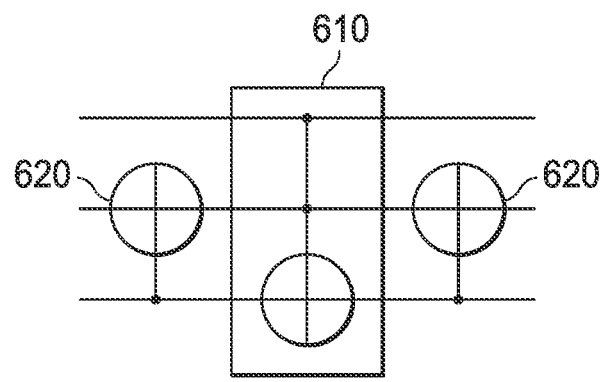
FIG. 6B is a block diagram of an implementation of a Fredkin gate suing two two-input quantum gates and one three-input quantum gate.

FIGS. 6A and 6B depict, respectively, a typical notational symbol for a Fredkin gate and a quantum circuit for a Fredkin gate. The Fredkin gate 600 can be constructed using a 3-input Toffoli gate 610 and two CNOT gates 620 coupled as shown in FIG. 6B. The Toffoli gate 610 can be considered as a controlled-controlled-NOT or as a single qubit NOT operator that utilizes two additional qubits to enable its operation. The Toffoli gate 610 can be decomposed into single and two-qubit operators by applying Barenco's decomposition theorem to the Toffoli gate (see e.g., [Bar+: 95]). Those operators are the single qubit Hadamard gate, and the two-qubit controlled operators consisting of the CNOT and the $R_z(\pi/2)$ rotation denoted as V.

$$V = R_z(\pi/2) = \begin{bmatrix} 1 & 0 \\ 0 & i \end{bmatrix}$$

Figure 6C:
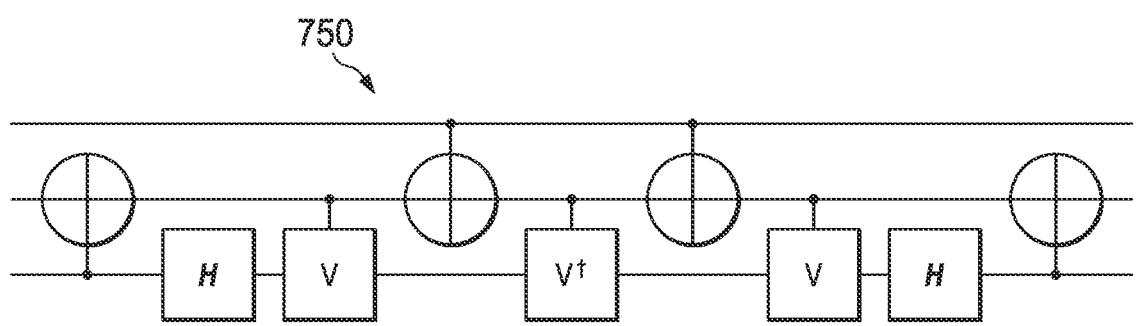
FIG. 6C is a block diagram of an alternative implementation of a Fredkin gate using only two-input quantum gates.

FIG. 6C thus depicts a representation of a Fredkin gate 650 as a cascade of these types of single and dual-input (controlled qubit) gates to provide further illustration and to indicate the quantum cost of the Fredkin function. Recently, a Fredkin gate has been realized experimentally at the Centre for Quantum Computation & Communication Technology at Griffith University in Australia (see e.g., [PHF+: 16]). In this implementation, the quantum state is encoded on the polarization of a photon, hence this implementation among others, may facilitate incorporation of a Fredkin gate into embodiments of a quantum coherence preservation circuit by, for example, coupling two quantum ring oscillator circuits.

Thus, two quantum ring oscillator circuits may be coupled through their feedback paths, using a Fredkin gate such that the state of the photons in each of the two quantum coherence preservation circuits may be swapped. Generally, a stored qubit may be injected into a first of the quantum ring oscillator circuits. Photonic preservation circuitry may be provided to determine an average number of times around this quantum ring oscillator structure that an individual photon can cycle without being absorbed or scattered. After a certain number of successful transits through the structure, the photonic preservation circuitry may elect to either release the photon from the circuit or to transfer the quantum information from one such quantum ring oscillator to a second quantum ring oscillator circuit. The Fredkin gate coupling the two quantum ring oscillator circuits may then be controlled (e.g., a qubit asserted on control line of the Fredkin gate) to swap the state of the photon carrying the qubit in the first quantum ring oscillator circuit with the state of the newly injected photon in the second quantum ring oscillator circuit. If it can be determined that the transfer is successful, then we can "reset" the counter that is used to measure the number of cycles that the photon has transited through the circuit. In this manner, the statistics of the state of the photon on which the qubit is stored may be effectively "refreshed", although there may have been no effect on the actual physical photon, but simply on the statistics of that particular photon.

Thus, embodiment of the quantum circuits as disclosed herein provide systems a for evolving the quantum states of one or more qubits in a deterministic and repeating fashion such that the decoherence time interval is maximized, thus decreasing the likelihood that decoherence or unintentional observations occur. Additionally, such quantum circuits may provide the capability to measure or otherwise utilize qubits that oscillate among basis states without disturbing the coherency of the quantum state in other portions of the structure and to provide a convenient means for the injection and extraction of the quantum information carriers without disturbing or destroying the functionality of the system or any system that incorporates such quantum circuits.

Although the invention has been described with respect to specific embodiments thereof, these embodiments are merely illustrative, and not restrictive of the invention. The description herein of illustrated embodiments of the invention, including the description in the Summary, is not intended to be exhaustive or to limit the invention to the precise forms disclosed herein (and in particular, the inclusion of any particular embodiment, feature or function within the Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein and throughout the claims that follow, the meaning of "in" includes "in" and "on" unless the context clearly dictates otherwise.

REFERENCES

The following references will be useful to an understanding of the disclosure and are fully incorporated herein by reference in their entirety for all purposes.

DiVincenzo, "The Physical Implementation of Quantum Computation", Fortschritte der Physik 48, p. 771 (2000)

Monz, T. et al. "Realization of the quantum Toffoli gate with trapped ions". Phys. Rev. Lett. 102, 040501 (2009)

[EPR:35] A. Einstein, B. Podolsky, and N. Rosen, "Can Quantum-Mechanical Description of Physical Reality be Considered Complete?" Physical Review, vol. 47, pp. 777-780, May 15, 1935.

[Bell:64] J. S. Bell, "On the Einstein Podolsky Rosen Paradox," Physics, 1, 1964, pp. 195-200, 1964.

[Bell:66] J. S. Bell, "On the Problem of Hidden Variables in Quatum Mechanics," Rev. Mod. Phys., 38(3), pp. 447-452, 1966.

[FC:72] S. J. Freedman, J. F. Clauser, "Experimental Test of Local Hidden-variable Theories," Phys. Rev. Lett., 28 (938), pp. 938-941, 1972.

[Asp+:81] A. Aspect, P. Grangier, and G. Roger, "Experimental Tests of Realistic Local Theories via Bell's Theorem," Phys. Rev. Lett., 47 (7), pp. 460-463, 1981.

[Asp+:82] A. Aspect, J. Dalibard, and G. Roger, "Experimental Test of Bell's Inequalities Using Time-varying Analyzers," Phys. Rev. Lett., 49 (25), pp. 1804-1807, 1982.

[FTR:07] K. Fazel, M. A. Thornton, and J. E. Rice, "ESOP-based Toffoli Gate Cascade Generation," in proc. IEEE Pacific Rim Conf. on Communications, Computers, and Signal Processing, pp. 206-209, Aug. 22-24, 2007.

[NWMTD:16] P. Niemann, R. Wile, D. M. Miller, M. A. Thornton, and R. Drechsler, "QMDDs: Efficient Quantum Function Representation and Manipulation," IEEE Trans. on CAD, vol. 35, no. 1, pp. 86-99, January 2016.

[MT:06] D. M. Miller and M. A. Thornton, QMDD: A Decision Diagram Structure for Reversible and Quantum Circuits, in proc. IEEE Int. Symp. on Multiple-Valued Logic, pp. 30-30 on CD-ROM, May 17-20, 2006.

[PHF+:16] R. B. Patel, J. Ho, F. Ferreyrol, T. C. Ralph, and G. J. Pryde, "A Quantum Fredkin Gate," Science Advances, vol. 2, no. 3, Mar. 4, 2016.

[Deu:85] D. Deutsch, "Quantum theory, the Church-Turing Principle and the Universal Quantum Computer," Proc. of Royal Society of London A, 400, pp. 97-117, 1985.

[Deu:89] D. Deutsch, "Quantum Computational Networks," Proc. of Royal Society of London A, 425(1868), pp. 73-90, 1989.

[DiV:98] D. P. DiVincenzo, "Quantum Gates and Circuits," Proc. of Royal Society of London A, 454(1969), pp. 261-276, 1998.

[Bar+:95] A. Barenco, et al., "Elementary Gates for Quantum Computation," quant-ph archive, March 1995.

[OBr:03] J. L. O'Brien, G. J. Pryde, A. G. White, T. C. Ralph, and D. Branning "Demonstration of an all-optical quantum controlled NOT gate," Nature, 426 264-267 (2003).

[OBr:07] J. L. O'Brien, "Optical Quantum Computing," Science, 318 1567-1570 (2007).

[Cer:97] N. J. Cerf, C. Adami, and P. G. Kwiat, "Optical simulation of quantum logic," arXiv:quant-ph/9706022v1 (1997).

[Gar:11] J. C. Garcia-Escartin and P. Chamorro-Posada, "Equivalent Quantum Circuits," arXiv:quant-ph/1110.2998v1 (2011).

[DH:76] W. Diffie, M. Hellman, "New Directions in Crpytography," IEEE Transactions Information Theory, November, 1976.

[El11] A. El Nagdi, K. Liu, T. P. LaFave Jr., L. R. Hunt, V. Ramakrishna, M. Dabkowski, D. L. MacFarlane, M. P. Christensen "Active Integrated Filters for RF-Photonic Channelizers" Sensors 11(2) 1297-1320 (2011).

[Su09] N. Sultana, W. Zhou, T. J. LaFave and D. L. MacFarlane "HBr Based ICP Etching of High Aspect Ratio Nanoscale Trenches in InP: Considerations for Photonic Applications" J. Vac. Sci. Technol. B 27 2351 (2009).

[Hu08] N. R. Huntoon, M. P. Christensen, D. L. MacFarlane, G. A. Evans, C. S. Yeh "Integrated Photonic Coupler Based on Frustrated Total Internal Reflection" Appl. Opt. 47 5682 (2008).

[Zh08] W. Zhou, N. Sultana and D. L. MacFarlane "HBr-Based Inductively Coupled Plasma Etching of High Aspect Ratio Nanoscale Trenches in GaInAsP/InP" J. Vac. Sci. Technol. B 26 1896 (2008).

[Am01] A. Ameduri, B. Boutevin, and B. Kostov "Fluoroelastomers: synthesis, properties and applications" Prog. Polym. Sci. 26 105 (2001).

[Ba03a] J. Ballato, S. Foulger, & D. W. Smith Jr. "Optical properties of perfluorocyclobutyl polymers" J. Opt. Soc. Am. B. 20(9) 1838-1843 (2003).

[Ia06] S. T. Iacono, S. M. Budy, D. Ewald, and D. W. Smith Jr. "Facile preparation of fluorovinylene aryl ether telechelic polymers with dual functionality for thermal chain extension and tandem crosslinking" Chem. Commun. (46) 4844 (2006).

[Ji06] J. Jiang, C. L. Callendar, C. Blanchetiere, J. P. Noad, S. Chen, J. Ballato, and D. W. Smith Jr. "Arrayed Waveguide Gratings Based on Perfluorocyclobutane Polymers for CWDM Applications" IEEE Photonics Technology Letters 18(2) 370-372 (2006).

[Ji06a] J. Jiang, C. L. Callender, C. Blanetiere, J. P. Noad, S. Chen, J. Ballato, & D. W. Smith Jr. "Property-tailorable PFCB-containing polymers for wavelength division devices" J. Lightwave Technology 24(8) 3227-3234 (2006).

[Sm02] D. W. Smith Jr, S. Chen, S. M. Kumar, J. Ballato, C. Topping, H. V. Shah and S. H. Foulger "Perfluorocyclobutyl Copolymers for Microphotonics" Adv. Mater. 14(21) 1585 (2002).

[St99] W. H. Steier, A. Chen, S. S. Lee, S. Garner, H. Zhang, V. Chuyanov, L. R. Dalton, F. Wang, A. S. Ren, C. Zhang, G. Todorova, A. Harper, H. R. Fetterman, D. T. Chen, A. Udupa, D. Bhattachara, B. Tsap "Polymer electro-optic devices for integrated optics" Chem. Phys. 245(1-3) 487-506 (1999).

[Su03] S. Suresh, R. Gulotty, Jr., S. E. Bales, M. N. Inbasekaran, M. Chartier, C. Cummins, D. W. Smith, Jr. "A novel polycarbonate for high temperature electro-optics via azo bisphenol amines accessed by Ullmann coupling" Polymer 44 5111 (2003).

[Su05] S. Suresh, H. Zengin, B. K. Spraul, T. Sassa, T. Wada, and D. W. Smith, Jr. "Synthesis and hyperpolarizabilities of high temperature triarylamine-polyene chromophores" Tetrahedron Lett. 46 3913-3916 (2005).

[On17] T. Ono, R. Okamoto, M. Tanida, H. F. Hofmann, S. Takeuchi "Implementation of a quantum controlled-SWAP gate with photonic circuits" Scientific Reports, 2017.

What is claimed is:

1. A system for the quantum coherence preservation of a qubit, comprising:
an oscillator adapted to operate in a quantum mode and in a classical mode, the oscillator including a plurality of cascaded stages, each stage including:
a circuit adapted to perform a corresponding operation in either the classical mode or in the quantum mode,
an input, and
an output, wherein the stage is adapted to evolve a qubit between a first state on the input and a second state on the output,
wherein the stages are cascaded such that the input of one stage is coupled to the output of a previous stage and the input of a first stage of the cascaded stages is coupled to the output of a last stage of the cascaded stages to form a feedback circuit path, and
wherein the classical mode is adapted for performing a quantum operation simultaneously on a plurality of independent qubits.

2. The system of claim 1, wherein the circuit for each stage is a square root of NOT gate.

3. The system of claim 1, wherein the circuit for each state is a Hadamard gate.

4. The system of claim 1, wherein the oscillator includes a Bell State oscillator (BSO), including:
a first stage comprising a first Bell State generator, including a first Hadamard gate and a first CNOT gate, the first Hadamard gate having an input and an output and the first CNOT gate having an input and an output;
a second stage comprising a second Bell State generator, including a second Hadamard gate and a second CNOT gate, the second Hadamard gate having an input and an output and the second CNOT gate having an input and an output, wherein the input of the second Hadamard gate is coupled to the output of the first Hadamard gate of the first Bell State generator and the input of the second CNOT gate is coupled to the output of the first CNOT gate of the first Bell State generator;
a third stage comprising a third Bell State generator, including a third Hadamard gate and a third CNOT gate, the third Hadamard gate having an input and an output and the third CNOT gate having an input and an output, wherein the input of the third Hadamard gate is coupled to the output of the second Hadamard gate of the second Bell State generator and the input of the third CNOT gate is coupled to the output of the second CNOT gate of the second Bell State generator; and a fourth stage comprising a fourth Bell State generator, including a fourth Hadamard gate and a fourth CNOT gate, the fourth Hadamard gate having an input and an output and the fourth CNOT gate having an input and an output, wherein the input of the fourth Hadamard gate is coupled to the output of the third Hadamard gate of the third Bell State generator and the input of the fourth CNOT gate is coupled to the output of the third CNOT gate of the third Bell State generator, and wherein the feedback circuit path is formed from the coupling of the input of the first Hadamard gate of the first Bell State generator to the output of the fourth Hadamard gate of the fourth Bell State generator and the coupling of the input of the first CNOT gate of the first Bell State generator to the output of the fourth CNOT gate of the fourth Bell State generator.

5. The system of claim 1, wherein the oscillator includes a Greenberger, Horne and Zeilinger (GHZ) state oscillator (GSO), including:

a first stage comprising a first GHZ state generator, including a first Hadamard gate, a first CNOT gate and a second CNOT gate, the first Hadamard gate having an input and an output, the first CNOT gate having an input and an output and the second CNOT gate having an input and an output;

a second stage comprising a second GHZ state generator, including a second Hadamard gate, a third CNOT gate and a fourth CNOT gate, the second Hadamard gate having an input and an output, the third CNOT gate having an input and an output, and the fourth CNOT gate having an input and an output, wherein the input of the second Hadamard gate is coupled to the output of the first Hadamard gate of the first GHZ state generator, the input of the third CNOT gate is coupled to the output of the second CNOT gate of the first GHZ state generator and the input of the fourth CNOT gate is coupled to the output of the second CNOT gate of the first GHZ state generator;

a third stage comprising a third GHZ state generator, including a third Hadamard gate, a fifth CNOT gate and a sixth CNOT gate, the third Hadamard gate having an input and an output, the fifth CNOT gate having an input and an output and the sixth CNOT gate having an input and an output, wherein the input of the third Hadamard gate is coupled to the output of the second Hadamard gate of the second GHZ state generator, the input of the fifth CNOT gate is coupled to the output of the third CNOT gate of the second GHZ state generator and the input of the sixth CNOT gate is coupled to the output of the fourth CNOT gate of the second GHZ state generator; and a fourth stage comprising a fourth GHZ state generator, including a fourth Hadamard gate, a seventh CNOT gate, and a eighth CNOT gate, the fourth Hadamard gate having an input and an output, the seventh CNOT gate having an input and an output, and the eighth CNOT gate having an input and an output, wherein the input of the fourth Hadamard gate is coupled to the output of the third Hadamard gate of the third GHZ state generator, the input of the seventh CNOT gate is coupled to the output of the fifth CNOT gate of the third GHZ state generator, and the input of the eighth CNOT gate is coupled to the output of the sixth CNOT gate of the third GHZ state generator, and wherein the feedback circuit path is formed from the coupling of the input of the first Hadamard gate of the first GHZ state generator to the output of the fourth Hadamard gate of the fourth GHZ state generator, the coupling of the input of the first CNOT gate of the first GHZ state generator to the output of the seventh CNOT gate of the fourth GHZ state generator, and the coupling of the input of the second CNOT gate of the first Bell State generator to the output of the eighth CNOT gate of the fourth GHZ state generator.

6. The system of claim 1, further comprising error correction circuitry adapted to apply error correction to the oscillator.

7. The system of claim 6, wherein the error correction circuitry is coupled to the quantum oscillator in the feedback circuit path of the quantum oscillator.

8. The system of claim 6, wherein the error correction circuitry applies error correction based on an error detection qubit.

9. The system of claim 8, wherein the error detection qubit is a basis-state carrier.

10. The system of claim 6, wherein the error correction is non-deterministic error correction.

11. A system for the quantum coherence preservation of a qubit, comprising:

a first oscillator comprising a first plurality of cascaded stages such that the input of one stage of the first plurality is coupled to the output of a previous stage of the first plurality and the first plurality of cascaded stages comprises a feedback circuit path, wherein each stage of the first plurality of cascaded stages is a quantum basis state stage or an intermediate quantum state stage and the first plurality of stages are cascaded such the stages of the first plurality of cascaded stages alternate between the quantum basis state stage and the intermediate quantum basis state stage; and a second oscillator comprising a second plurality of cascaded stages such that the input of one stage of the second plurality is coupled to the output of a previous stage of the second plurality and the second plurality of cascaded stages comprises a feedback circuit path, wherein each stage of the second plurality of cascaded stages is the quantum basis state stage or the intermediate quantum state stage and the second plurality of stages are cascaded such the stages of the second plurality of cascaded stages alternate between the quantum basis state stage and the intermediate quantum basis state stage, wherein the first oscillator is coupled to the second oscillator, the coupling of the first oscillator to the second oscillator comprising a coupling of a first stage of the first plurality of cascades stages of the first oscillator to a second stage of the second plurality of cascade stage of the second oscillator, wherein the first stage of the first plurality of cascaded stages of the first oscillator is the intermediate quantum basis state stage and the second stage of the second plurality of cascade stage of the second oscillator is the quantum basis state stage or the intermediate quantum state stage.

12. The system of claim 11, wherein each of the first plurality of stages includes a square root of NOT gate or a Hadamard gate.

13. The system of claim 12, wherein each of the second plurality of stages includes a square root of NOT gate or a Hadamard gate.

14. The system of claim 11, wherein the first oscillator or second oscillator comprises a Bell State oscillator (BSO).

15. The system of claim 11, wherein the first oscillator or second oscillator comprises a Greenberger, Horne and Zeilinger (GHZ) state oscillator (GSO).

16. The system of claim 11, wherein the first oscillator or second oscillator further comprising error correction circuitry adapted to apply error correction to the oscillator.

17. The system of claim 16, wherein the error correction circuitry applies error correction based on an error detection qubit.

18. The system of claim 17, wherein the error detection qubit is a basis-state carrier.

19. The system of claim 16, wherein the error correction is non-deterministic error correction.

20. The system of claim 11, wherein the error correction circuitry is coupled to the first oscillator or the second oscillator in the feedback circuit path of the first oscillator or the second oscillator.

* * * * *